US009563265B2

(12) United States Patent
You et al.

(10) Patent No.: US 9,563,265 B2
(45) Date of Patent: Feb. 7, 2017

(54) AUGMENTED REALITY WITH SOUND AND GEOMETRIC ANALYSIS

(75) Inventors: Kisun You, Suwon (KR); Taesu Kim, Seoul (KR); Kyuwoong Hwang, Taejon (KR); Minho Jin, Anyang (KR); Hyun-Mook Cho, Seoul (KR); Te-Won Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 13/585,927

(22) Filed: Aug. 15, 2012

(65) Prior Publication Data

US 2013/0182858 A1 Jul. 18, 2013

Related U.S. Application Data

(60) Provisional application No. 61/585,945, filed on Jan. 12, 2012.

(51) Int. Cl.
| | |
|---|---|
| *G06F 3/01* | (2006.01) |
| *G06F 3/16* | (2006.01) |
| *G06T 15/00* | (2011.01) |
| *G09G 5/00* | (2006.01) |
| *G09G 5/08* | (2006.01) |

(52) U.S. Cl.
CPC .............. *G06F 3/011* (2013.01); *G06F 3/167* (2013.01)

(58) Field of Classification Search
CPC ................... H04N 2201/3245; H04N 2101/00; H04N 1/00204; G06T 15/00; G06T 19/00; G06T 19/006; G06T 17/20; G09G 5/00; G09G 5/08; H04R 29/00; H04R 29/001; H04R 29/004; G06F 3/011
USPC ......... 345/633, 419, 158; 381/58; 348/207.1
See application file for complete search history.

(56) References Cited

U.S. PATENT DOCUMENTS

| 6,330,486 B1 | 12/2001 | Padula |
| 6,816,437 B1 | 11/2004 | Teller et al. |
| 8,170,222 B2 * | 5/2012 | Dunko .................... H04S 1/002 381/17 |

(Continued)

FOREIGN PATENT DOCUMENTS

| CN | 101132839 A | 2/2008 |
| EP | 2395767 | 12/2011 |

(Continued)

OTHER PUBLICATIONS

International Search Report and Written Opinion of the International Searching Authority for International Application No. PCT/US2012/066194 mailed Mar. 5, 2013, 17 pages.

(Continued)

*Primary Examiner* — Duc Nguyen
*Assistant Examiner* — Yogeshkumar Patel
(74) *Attorney, Agent, or Firm* — Toler Law Group, PC

(57) ABSTRACT

A method for responding in an augmented reality (AR) application of a mobile device to an external sound is disclosed. The mobile device detects a target. A virtual object is initiated in the AR application. Further, the external sound is received, by at least one sound sensor of the mobile device, from a sound source. Geometric information between the sound source and the target is determined, and at least one response for the virtual object to perform in the AR application is generated based on the geometric information.

37 Claims, 25 Drawing Sheets

(56) References Cited

U.S. PATENT DOCUMENTS

| | | | |
|---|---|---|---|
| 8,184,069 B1* | 5/2012 | Rhodes | G02B 27/017 345/8 |
| 2003/0018771 A1* | 1/2003 | Vinberg | G06Q 10/06 709/223 |
| 2006/0204012 A1 | 9/2006 | Marks et al. | |
| 2006/0239471 A1 | 10/2006 | Mao et al. | |
| 2009/0180624 A1* | 7/2009 | Nakayama | A63F 13/10 381/17 |
| 2009/0238378 A1* | 9/2009 | Kikinis | H04N 13/0497 381/92 |
| 2009/0262946 A1* | 10/2009 | Dunko | H04S 1/002 381/17 |
| 2010/0040238 A1* | 2/2010 | Jang | H04S 7/302 381/17 |
| 2011/0213664 A1* | 9/2011 | Osterhout | G02B 27/017 705/14.58 |
| 2011/0214082 A1* | 9/2011 | Osterhout | G02B 27/017 715/773 |
| 2011/0216192 A1 | 9/2011 | Leung et al. | |
| 2011/0221656 A1* | 9/2011 | Haddick | G02B 27/017 345/8 |
| 2011/0242134 A1* | 10/2011 | Miller | G06T 19/006 345/633 |
| 2011/0310260 A1* | 12/2011 | Jordan | G06F 3/011 348/207.1 |
| 2012/0019558 A1* | 1/2012 | Jung | H04W 4/04 345/633 |
| 2012/0075168 A1* | 3/2012 | Osterhout | G02B 27/017 345/8 |
| 2012/0075285 A1* | 3/2012 | Oyagi | G06T 19/006 345/419 |
| 2012/0113228 A1* | 5/2012 | Konno | H04N 13/0239 348/47 |
| 2012/0194418 A1* | 8/2012 | Osterhout | G02B 27/0093 345/156 |
| 2012/0194419 A1* | 8/2012 | Osterhout | G02B 27/0093 345/156 |
| 2012/0194420 A1* | 8/2012 | Osterhout | G02B 27/0093 345/156 |
| 2012/0194549 A1* | 8/2012 | Osterhout | G02B 27/0093 345/633 |
| 2012/0194550 A1* | 8/2012 | Osterhout | G02B 27/0093 345/633 |
| 2012/0194551 A1* | 8/2012 | Osterhout | G02B 27/0093 345/633 |
| 2012/0194552 A1* | 8/2012 | Osterhout | G02B 27/0093 345/633 |
| 2012/0194553 A1* | 8/2012 | Osterhout | G02B 27/0093 345/633 |
| 2012/0200488 A1* | 8/2012 | Osterhout | G02B 27/0093 345/156 |
| 2012/0200499 A1* | 8/2012 | Osterhout | G02B 27/0093 345/158 |
| 2012/0200601 A1* | 8/2012 | Osterhout | G02B 27/0093 345/633 |
| 2012/0206322 A1* | 8/2012 | Osterhout | G02B 27/0093 345/8 |
| 2012/0206323 A1* | 8/2012 | Osterhout | G02B 27/0093 345/8 |
| 2012/0206334 A1* | 8/2012 | Osterhout | G06F 1/163 345/156 |
| 2012/0206335 A1* | 8/2012 | Osterhout | G02B 27/0093 345/156 |
| 2012/0206485 A1* | 8/2012 | Osterhout | G02B 27/0093 345/633 |
| 2012/0207308 A1* | 8/2012 | Sung | H04S 7/304 381/17 |
| 2012/0212400 A1* | 8/2012 | Border | G02B 27/017 345/8 |
| 2012/0212414 A1* | 8/2012 | Osterhout | G02B 27/017 345/158 |
| 2012/0306850 A1* | 12/2012 | Balan | G06T 19/006 345/419 |
| 2012/0324213 A1* | 12/2012 | Ho | G06F 1/1626 713/100 |
| 2012/0327115 A1* | 12/2012 | Chhetri | H04R 3/005 345/633 |
| 2013/0021373 A1* | 1/2013 | Vaught | G02B 27/017 345/633 |
| 2013/0083064 A1* | 4/2013 | Geisner | G06F 17/30047 345/633 |
| 2013/0094682 A1* | 4/2013 | Lee | G02B 27/01 381/306 |
| 2013/0162644 A1* | 6/2013 | Velkavrh | G06T 17/05 345/423 |
| 2013/0169683 A1* | 7/2013 | Perez | G02B 27/02 345/633 |
| 2013/0314303 A1* | 11/2013 | Osterhout | G06F 3/005 345/8 |
| 2014/0063054 A1* | 3/2014 | Osterhout | G06F 3/005 345/633 |
| 2014/0063055 A1* | 3/2014 | Osterhout | G06F 3/005 345/633 |

FOREIGN PATENT DOCUMENTS

| | | |
|---|---|---|
| JP | H1165814 A | 3/1999 |
| JP | 2008539874 A | 11/2008 |
| JP | 2012094100 A | 5/2012 |
| WO | 2004038697 | 5/2004 |
| WO | 2006121681 A1 | 11/2006 |
| WO | 2006121896 | 11/2006 |

OTHER PUBLICATIONS

Lee, Ahyun et al., "Real-time Camera Pose Estimation for Augmented Reality System Using a Square Marker", 2010 International Symposium on Wearable Computers (ISWC), Oct. 2010, pp. 1-2.

Maidi, Madjid et al., "A Performance Study for Camera Pose Estimation Using Visual Marker Based Tracking", Machine Vision and Applications, vol. 21, No. 3, Oct. 1, 2008, pp. 365-376.

Otsuki, Mai et al., "Novel Interaction Methods with Mixed Reality Space", SICE Annual Conference, 2008, Aug. 2008, pp. 456-460.

Van Veen, Barry D et al., "Beamforming: A Versatile Approach to Spatial Filtering", IEEE ASSP Magazine, vol. 5, No. 2, Apr. 1988, pp. 4-24.

Cohen et al., "From Whereware to Whence- and Whitherware: Augmented Audio Reality for Position-Aware Services", IEEE International Symposium on Virtual Reality Innovation, pp. 273-280 (2011).

Harma, A. et al., "Augmented Reality Audio for Mobile and Wearable Appliances", J. Audio Eng. Soc., vol. 52, No. 6, Jun. 2004, pp. 618-639.

Zhou et al., The Role of 3-D Sound in Human Reaction and Performance in Augmented Reality Environments, IEEE Transactions on Systems, Man, and Cybernetics—Part A: Systems and Humans, vol. 37, No. 2, pp. 262-272 (Mar. 2007).

Ohtsuki M., et al., "Design and Implementation of a Novel Method of Interacting with Mixed Reality Space", The Virtual Reality Society of Japan, Jun. 30, 2008, vol. 13, No. 2, pp. 247-255.

\* cited by examiner

AUGMENTED REALITY WITH SOUND AND GEOMETRIC ANALYSIS

CROSS-REFERENCE TO RELATED APPLICATIONS

This application is based upon and claims the benefit of priority from U.S. Provisional Patent Application No. 61/585,945, filed on Jan. 12, 2012, the entire contents of which are incorporated herein by reference.

TECHNICAL FIELD

The present disclosure relates generally to implementing augmented reality in mobile devices. More specifically, the present disclosure relates to generating a response for a virtual object in an augmented reality environment of a mobile device based on an external sound.

BACKGROUND

Recently, the use of mobile devices has increased widely due to their convenience in portability and functionality. At the same time, consumers' demand for entertainment and reality applications has increased with the widespread use of the mobile devices. In order to provide entertainment and reality applications, some mobile devices provide augmented reality technology.

Augmented reality ("AR") is a type of virtual reality that aims to merge real-world environment with digital information. Unlike a typical virtual reality which provides a virtual object in a virtual space, an augmented reality system generates a composite view that combines a real-world image viewed by the user and a computer-generated image to augment the real-world image with additional information.

In addition to providing a visual augmented reality, some AR environments have provided a capability to recognize an external sound of the mobile device. However, such AR environments typically have not adequately reflected the external sound environment. Accordingly, these AR environments may not provide sufficient level of reality for the users. For example, in a conventional AR environment, an AR object may only react as though all external sounds originate from the mobile device. Therefore, such AR applications have not provided satisfactory augmented reality experience for users.

SUMMARY

The present disclosure provides methods and apparatus for responding in an augmented reality (AR) application of a mobile device to an external sound. In these methods and apparatus, based on the received external sound, geometric information among a mobile device, a target, and a sound source of the external sound is determined. A response for a virtual object to perform in an AR environment of the AR application is then generated based on the geometric information.

According to one aspect of the present disclosure, a method for responding in an augmented reality (AR) application of a mobile device to an external sound is disclosed. The method includes detecting a target. A virtual object is initiated in the AR application. Further, the external sound is received, by at least one sound sensor of the mobile device, from a sound source. First geometric information between the sound source and the target is determined, and at least one response for the virtual object to perform in the AR application is generated based on the first geometric information. This disclosure also describes a device, a combination of means, and a computer-readable medium relating to this method.

According to another aspect of the present disclosure, a device for responding to an external sound in an augmented reality (AR) application is disclosed. The device includes a sensor and a control unit. The sensor, including an image sensor and at least one sound sensor, is configured to receive images including a target and an external sound from one sound source. The control unit includes a target object detector, an application initiating unit, a geometric information calculation unit, and an AR response generator. The target object detector is configured to detect the target in the images. The application initiating unit is configured to initiate a virtual object in the AR application in response to the detected target. The geometric information calculation unit is configured to determine first geometric information between the one sound source and the target. Also, at least one response for the virtual object to perform in the AR application is generated by the AR response generator based on the first geometric information.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Figure 1:
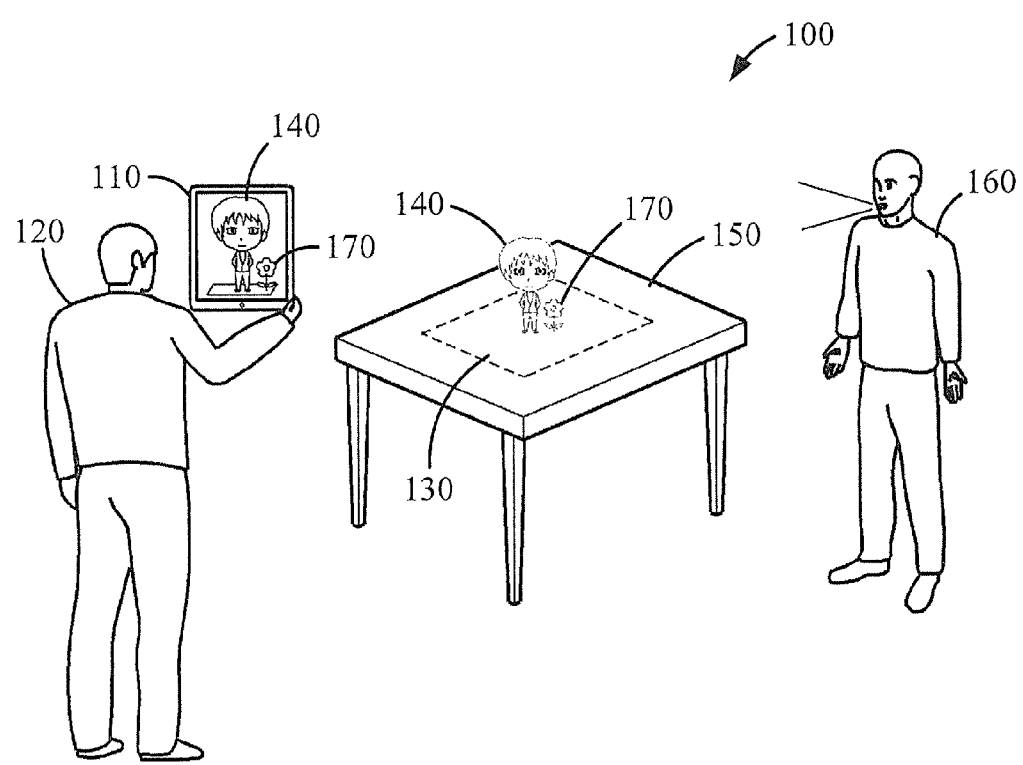
FIG. 1 illustrates a diagram of a real-world environment in which an augmented reality (AR) application is executed in a mobile device in accordance with one embodiment of the present disclosure.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates a real-world environment 100 in which an augmented reality (AR) application is executed in a mobile device 110 for responding to an external sound according to one embodiment of the present disclosure. A user 120 operates the mobile device 110 which includes at least a video camera, a display screen, at least one microphone and an AR application. The mobile device 110 may be a portable computing device such as a tablet PC, a smartphone, a gaming device, and the like, and may include any standard components and functions of such devices.

As illustrated in FIG. 1, the user 120 interacts with an augmented reality environment displayed on the mobile device 110. A target 130 is provided on a table 150, and is used by the mobile device 110 to initiate the AR application when the target 130 is detected. The target 130 may be a predetermined AR tag or a marker which can be detected by the mobile device 110 to initiate the AR application. As long as the target 130 is detected, the AR application continues to run on the mobile device 110. For example, when the user 120 moves the mobile device 110 to capture the target 130 through an image sensor such as a video camera, the mobile device 110 initiates the AR application, which displays a virtual object 140 and a virtual background 170 in an AR environment. After the AR application is initiated, the AR environment is displayed on the display of the mobile device 110 in real-time without substantial time delay, and is configured to reflect an external sound or the user's action. For example, the mobile device 110 may receive an external sound from the user 120 or an external sound source 160, e.g., a person present in the real-world environment 100.

Figure 2A:
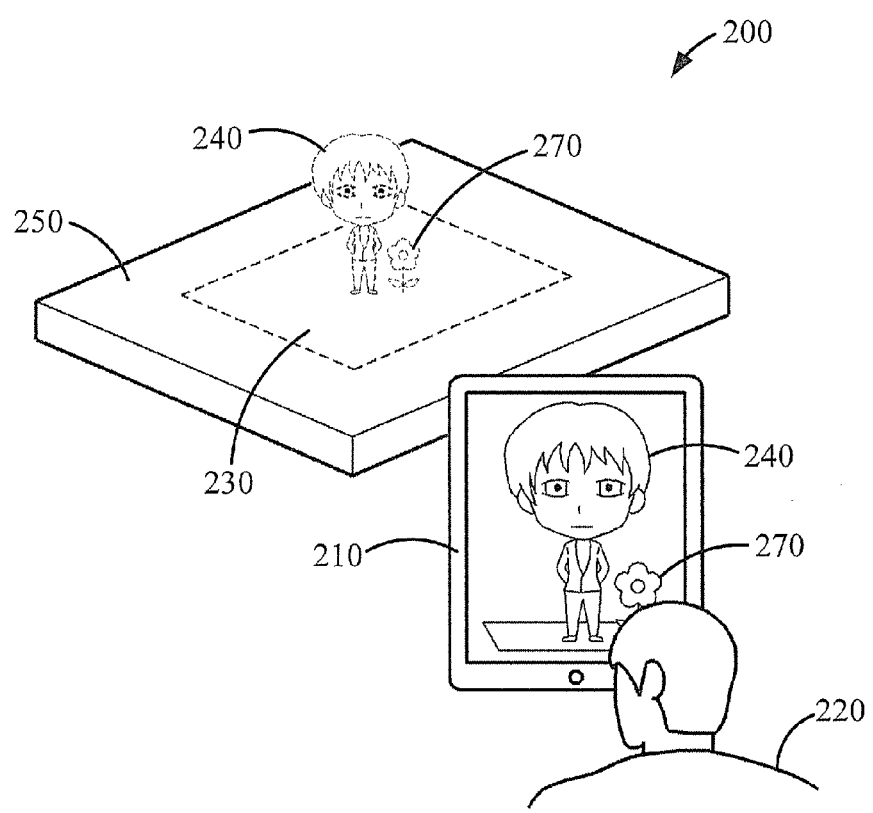
FIGS. 2A and 2B illustrate diagrams of viewing and terminating an augmented reality environment in a mobile device in accordance with one embodiment of the present disclosure.

FIG. 2A illustrates a user 220 using a mobile device 210 to view an augmented reality environment according to one embodiment of the present disclosure. In FIG. 2A, the user 220 maneuvers the mobile device 210 to capture the image of a target 230 located on a table 250 via an image sensor of the mobile device 210. When the image of the target 230 is detected, the mobile device 210 compares the captured target 230 with a plurality of predetermined targets stored therein. Then, if the mobile device 210 determines that the captured target 230 matches one of the plurality of predetermined targets, the AR application is initiated. Alternatively, the mobile device 210 may initiate the AR application in response to a predetermined external sound received via a sound sensor. In this case, the external sound may be compared with predetermined sound models to initiate the AR application. Additionally, the AR application may be initiated in response to a user input on the mobile device 210 such as entering information through a user interface (e.g., a touch screen, a button, a keypad, a joystick, a touchpad, etc.) or in response to a change in light input.

The AR application augments the captured image in real-time with a virtual object 240 and a virtual background 270 to generate and display an AR environment on the mobile device 210. For example, the virtual object 240 and the virtual environment 270 may be superimposed on the captured background image of a real-world environment 200 for display on the display of the mobile device 210. In this arrangement, the virtual object 240 may be configured to respond to external sounds and user's actions for interactive experience. Upon the initiation of the AR application, as shown in FIG. 2A, the virtual object 240 is initially displayed over the target 230. Alternatively, the virtual object 240 may be located in any suitable positions relative to the target 230. Further, the target 230 may be displayed in the augmented reality environment, or may not be displayed in the augmented reality environment.

From the user's view of the AR environment displayed in real-time on the display of the mobile device 210, the virtual object 240 and the virtual background 270 are virtual in that they are displayed only on the display of the mobile device 210. The virtual object 240 and the target 230 are depicted for illustrative purposes only, as indicated by the dotted lines on the table 250. The virtual object 240 may be any computer-generated image including a human-like character or objects such as cars.

Figure 2B:
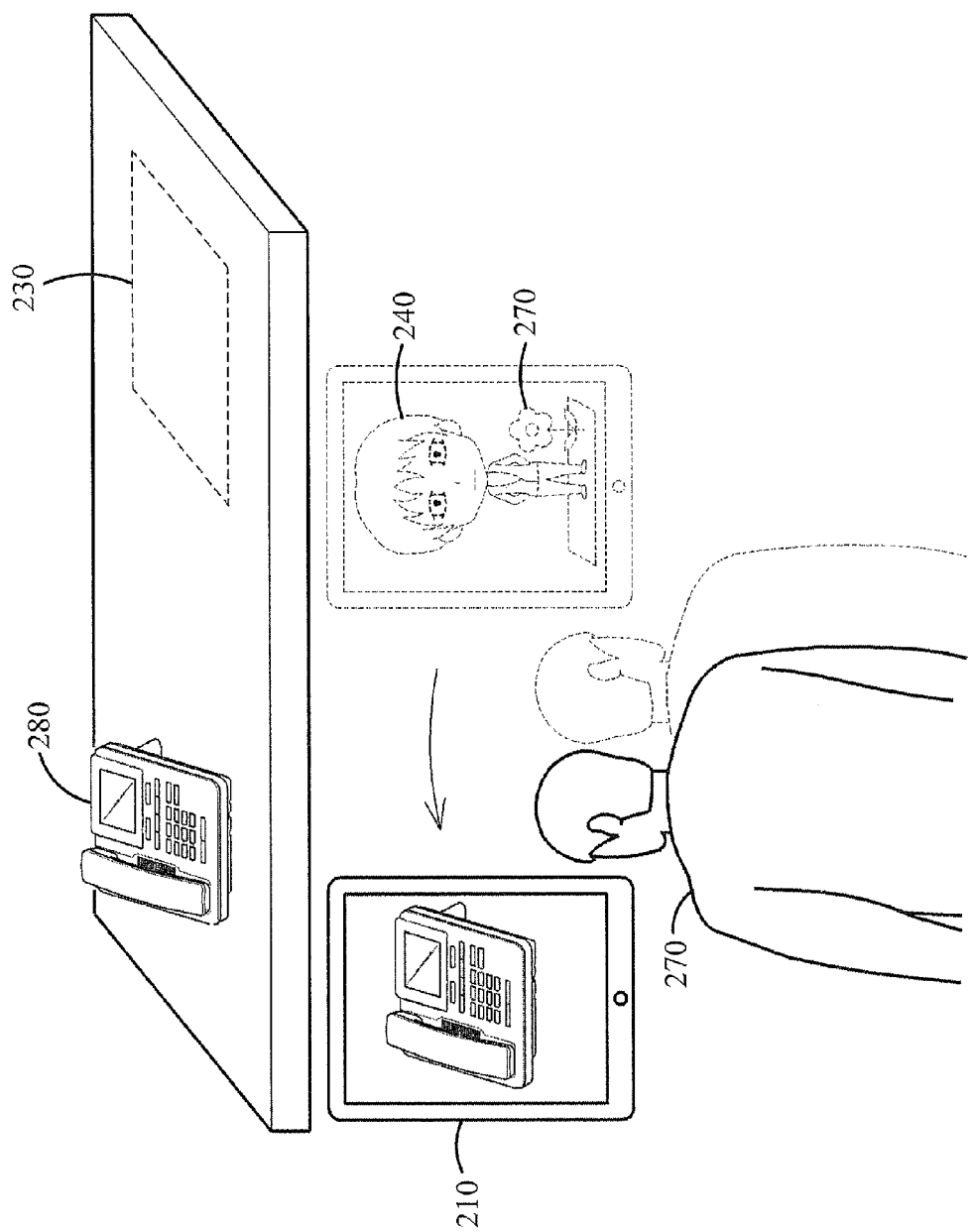

FIG. 2B illustrates a termination of an AR environment in the mobile device 210 and returning to a normal video operation according to one embodiment of the present disclosure. Initially, in FIG. 2B, the AR environment including the virtual object 240 and the virtual background 270 are displayed on the display of the mobile device 210 while the target 230 is detected. However, when the user 220 moves the mobile device 210 away from the target 230, the mobile device 210 terminates displaying the AR environment and returns to its normal video operation. In the illustrated example in FIG. 2B, the user 220 moves the mobile device 210 to capture a telephone 280 away from the target, and thus, the mobile device 210 terminates displaying the AR environment and instead displays an image of the telephone 280 in its normal video operation. On the other hand, if another target is detected on or proximate to the telephone 280, the mobile device 210 may initiate an AR environment with the virtual object 240 and/or the virtual background 270. In some embodiments, when the target 230 or a predetermined external sound is no longer detected after the AR environment has been initiated, the mobile device 210 may perform other tasks while continuing to run the AR environment in the background. In this case, if the target 230 or sound is detected, the mobile device 210 may return to displaying the AR environment.

Figure 3:
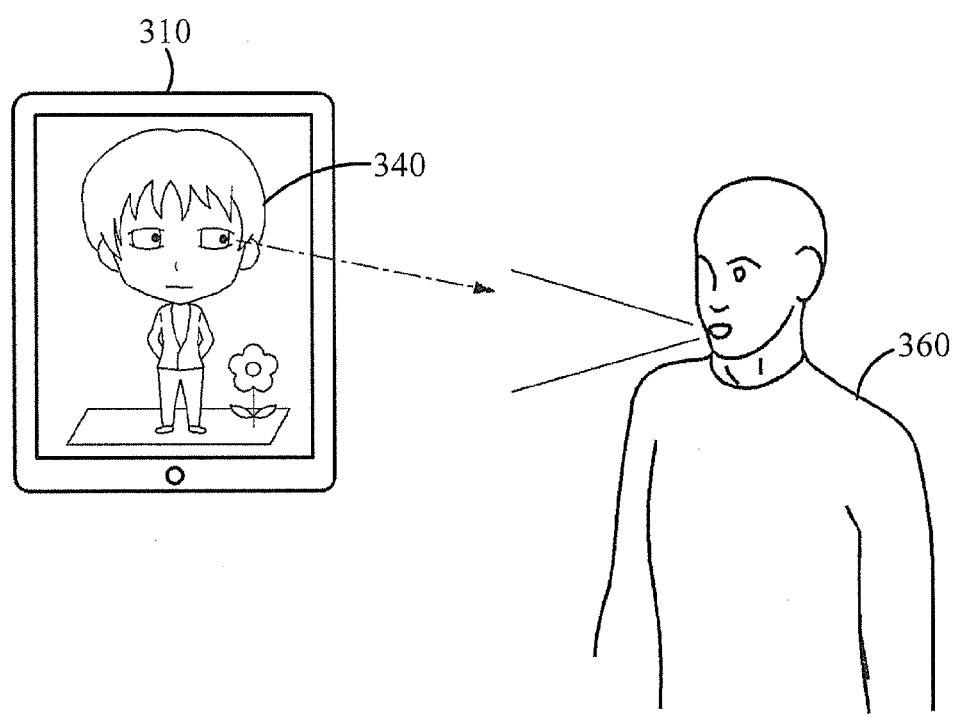
FIG. 3 illustrates a diagram of a virtual object responding to an external sound from a sound source in accordance with one embodiment of the present disclosure.

FIG. 3 illustrates a diagram of a virtual object 340 responding to an external sound from an external sound source 360 according to one embodiment of the present disclosure. For ease of understanding, a table and a target are not illustrated in FIG. 3, but it should be appreciated that the AR environment is running in a mobile device 310 after the target has been detected by the mobile device 310. In this AR environment, the mobile device 310 receives an external sound from the external sound source 360 present in the real-world environment. The external sound source 360 may be another person as illustrated in FIG. 3, or any sound source which generates sound that can be detected by the mobile device 310. In response to the external sound, the virtual object 340 may be configured to perform an action indicating that it is aware of the external sound source 360 from which the external sound is generated. For example, the virtual object 340 may look or move in the direction of the external sound source 360 from the center of the target where the virtual object 340 is initially placed. The virtual object 340 may also be configured to take any action or inaction in response to the received external sound. For example, if the mobile device 310 receives an ambient sound that is perceived to be a noise, the virtual object 340 may not perform any actions in response to the received ambient sound.

Figure 4:
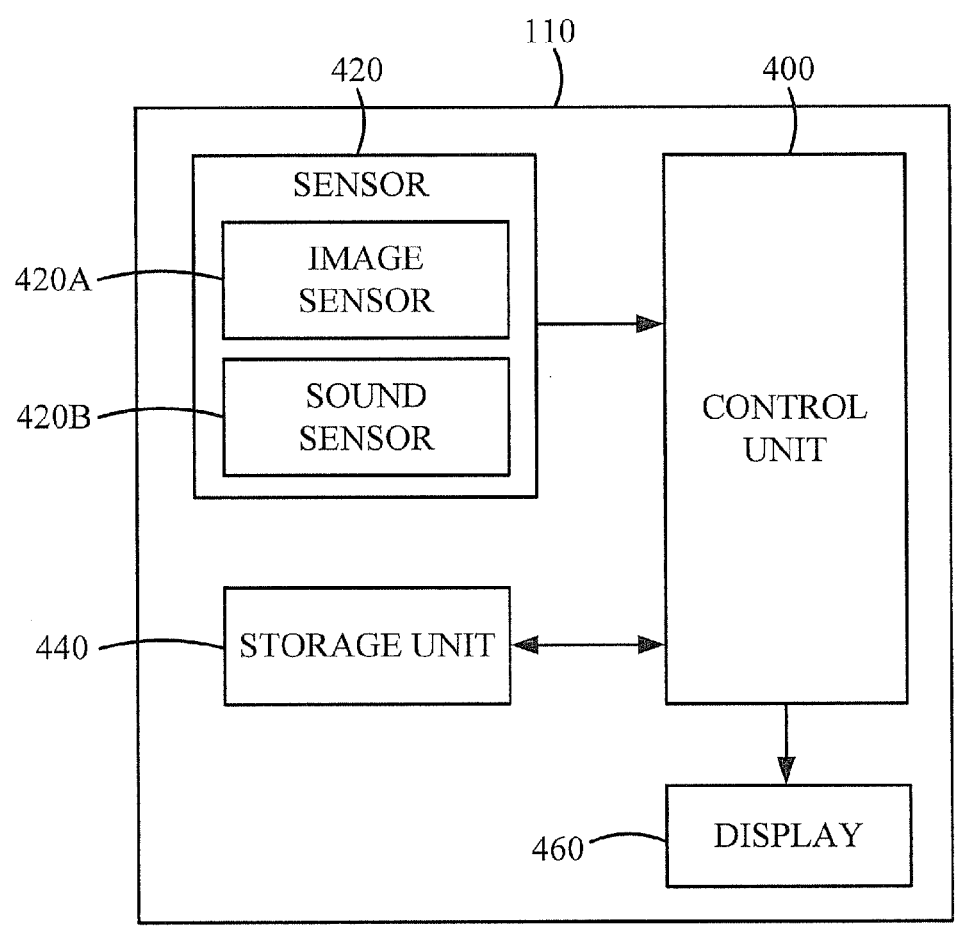
FIG. 4 is a block diagram of a mobile device for providing an augmented reality environment to a user in accordance with one embodiment of the present disclosure.

FIG. 4 is a block diagram of the mobile device 110 for providing an augmented reality environment to a user according to one embodiment of the present disclosure. The mobile device 110 includes a control unit 400, a sensor 420, a storage unit 440, and a display 460. The sensor 420 further includes an image sensor 420A and a sound sensor 420B. It should be understood that these components may be combined with any mobile device described in this disclosure.

When operating in a normal video mode, the image sensor 420A of the mobile device 110 captures real-world images, and the sound sensor 420B receives external sounds. From the captured real-world images, the control unit 400 is configured to determine whether the images include a target. If no target is detected, the mobile device 110 may continue to operate in the normal video mode. On the other hand, if the control unit 400 determines that at least one of the captured images includes the target, the control unit 400 is configured to initiate the AR application stored in the storage unit 440 and display the AR environment on the display of the mobile device 110 for the user. For example, as shown in FIG. 1, when the mobile device 110 captures the target 130, the control unit 400 may superimpose the virtual object 140 and the virtual background 170 onto the captured images in real time on the display 460 of the mobile device 110.

Further, the control unit 400 is configured to analyze the external sound received by the sound sensor 420B. Based on the received external sound, the control unit 400 is configured to generate a response for the virtual object to perform in the AR environment. Specifically, the control unit 400 determines geometric information relating to the target 130, the mobile device 110 and a sound source 160 of the external sound.

The geometric information indicates directional and positional relationships among the mobile device 110, the target 130, and the sound source 160. The geometric information between the mobile device 110 and the target 130 may be determined by using a camera pose estimation technique, which uses information stored in the mobile device 110 relating to feature points of the target 130 (e.g., the number of feature points, coordinates of feature points) and a physical size of the target 130. Camera pose estimation technique is used to reduce re-projection errors of a conventional camera model. For example, the technique may estimate a camera pose having a predetermined number of degrees of freedom (DOF) by determining correspondences between feature points in a 2-D image and in a 3-D image. Based on the correspondences, 3-D feature points may be projected into 2-D feature points using well-known camera pose transformation methods.

For example, a distance between the mobile device 110 and the target 130 may be determined based on a focal distance of the image sensor 420A of the mobile device 110 and a ratio of the stored physical size of the detected target 130 to the size of the captured target on the display 460. Further, the geometric information between the mobile device 110 and the sound source 160 may be obtained using a beamforming technique. For example, the beamforming technique may estimate the location of the sound source 160 based on the sound received from the sound source by the sound sensor 420B of the mobile device 110. Based on the obtained geometric information above, the geometric information between the target 130 and the sound source 160 may be determined. Determining the geometric information will be described in more detail with reference to FIGS. 8A and 8B.

Further, the control unit 400 is configured to determine that a plurality of sounds from different sound sources is included in the received external sound. In this case, the received external sound may be separated into a plurality of sounds. Further, the control unit 400 is configured to determine geometric information for each of the sound sources corresponding to the plurality of sounds, respectively. Based on the determined geometric information, a response, which may be an action or inaction for the virtual object to perform, is determined for each of the sound sources. Then, the control unit 400 may determine an output order of responses for the virtual object 140 to perform. In the case where a response is an inaction, the output order of the responses may omit the inaction response altogether.

In addition, based on the sound characteristics of the external sound (e.g., music, claps, etc.), the control unit 400 may also determine a response for the virtual object 140 to perform in the AR environment. A set of reference sounds and corresponding AR responses may be stored in the storage unit 440, and the received external sound may be compared with the stored reference sounds. Further, the set of reference sounds may be used as reference models to be compared with the received external sound. Based on the comparison, the control unit 400 may determine a corresponding response to the matching reference sound, and output the response for the virtual object 140 to perform in the AR environment. The responses for the virtual object 140 to perform based on the external sound are not limited to the above examples, and the order of responses may be performed based on the distance of the mobile device 110 with respect to the target 130. For example, in the case where the external sound is unrecognized sound, such as noise, the control unit 400 may generate no action or an inaction associated with the unrecognized sound. Further, the control unit 400 may include other components and perform functions of conventional mobile devices not shown in FIG. 4.

Figure 5:
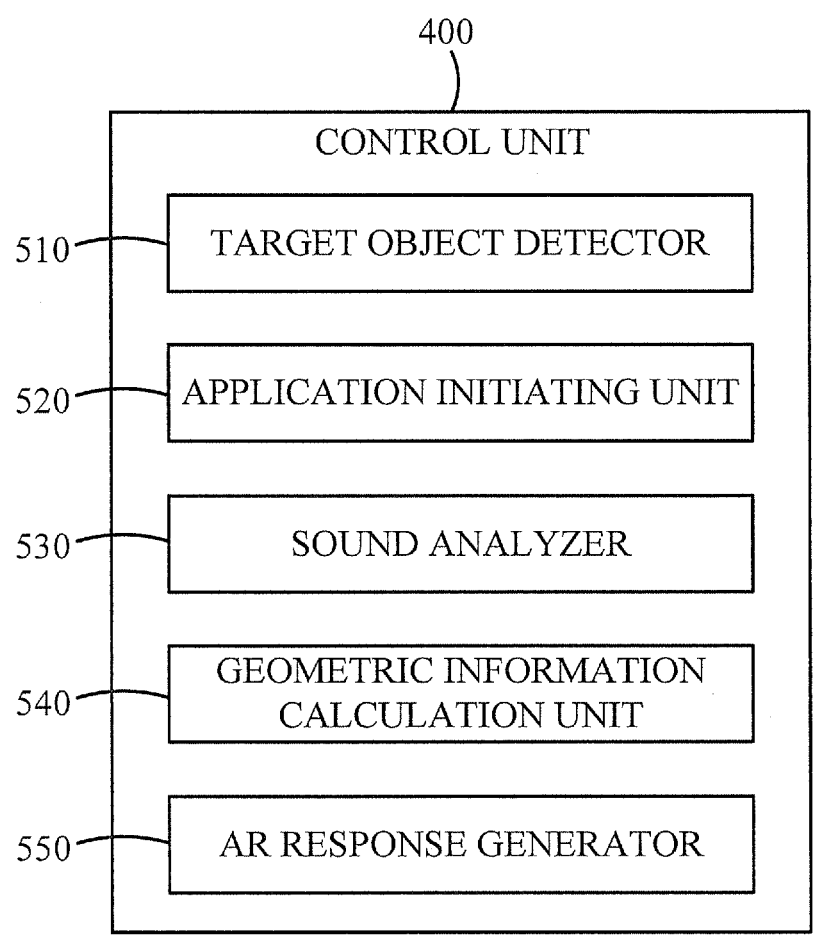
FIG. 5 is a block diagram of a control unit of the mobile device for providing an augmented reality environment to a user in accordance with one embodiment of the present disclosure.

FIG. 5 is a more detailed block diagram of the control unit 400 of the mobile device 110 in accordance with one embodiment of the present disclosure. The control unit 400 includes a target object detector 510, an AR application initiating unit 520, a sound analyzer 530, a geometric information calculation unit 540, and an AR response generator 550.

The target object detector 510 is configured to detect a predetermined target from the captured image. If the target object detector 510 determines that the captured image includes the target 130, the AR application initiating unit 520 is configured to initiate the AR application to generate an AR environment on the display 460 of the mobile device 110 for the user 120. For example, as shown in FIG. 1, the virtual object 140 and the virtual background 170 are displayed on the display of the mobile device 110.

The sound analyzer 530 in the control unit 400 is configured to detect an external sound from the sound sensor 420B. If the external sound is detected, the geometric information calculation unit 540 is configured to determine the geometric information among the mobile device 110, the target 130, and the sound source 160 of the external sound. To obtain the position and the orientation of the target 130 in the captured image, the target 130 is compared with, for example, a pre-stored image of the target at a specific distance and angle from the mobile device 110. Based on the comparison, the geometric information calculation unit 540 is configured to determine the position, orientation and movement of the mobile device 110. Additionally, the movement of the mobile device 110 may be monitored based on information from a motion sensing device within the mobile device 110, such as an accelerometer, magnetometer, or gyroscope. Further, the geometric information calculation unit 540 may determine position and orientation of the mobile device 110 to determine the geometric information among the mobile device 110, the target 130, and the sound source 160. Further, the information from the motion sensing device may be combined with any suitable methods that can ascertain the position and movement of the mobile device 110.

Next, the geometric information calculation unit 540 is configured to determine the geometric information between the mobile device 110 and the target 130 using the camera pose estimation technique and the geometric information between the mobile device 110 and the sound source 160 including the position of the sound source using the beamforming technique. Based on the determined position and orientation of the mobile device 110, the geometric information between the mobile device 110 and the target 130, and the geometric information between the mobile device 110 and the sound source 160, the geometric information calculation unit 540 is configured to determine the geometric information between the target 130 and the sound source 160.

The geometric information between the mobile device 110 and the target 130 may include at least one of a distance and an angle between the mobile device 110 and the target 130. In this case, based on the position and orientation of the mobile device 110, the major plane of the mobile device 110 (e.g., the back plane of the mobile device 110) may be used as a reference plane. Further, the geometric information calculation unit 540 may determine a vector orthogonal to the reference plane and a vector from the reference plane to the target. Then, an angle between the two vectors may be determined as a part of geometric information between the mobile device 110 and the target 130. The geometric information between the mobile device 110 and the sound source 160 may be determined in a similar manner.

Based on the determined geometric information between the mobile device 110 and the target 130 and between the mobile device 110 and the sound source 160, the geometric information calculation unit 540 may determine geometric information between the target 130 and the sound source 160. For example, based on three points, i.e., the mobile device 110, the target and the sound source, a distance between the target 130 and the sound source 160 may be determined using the two previously determined vectors. More details for determining the geometric information will be described with reference to FIGS. 8A and 8B.

Based on the determined geometric information among the mobile device 110, the target 130 and the sound source 160, the AR response generator 550 is configured to generate a response for the virtual object 140 to perform in the AR environment. For example, the AR response generator 550 may generate a response for the virtual object 140 standing at the center of the target to look in the direction of the sound source 160. Alternatively, the virtual object 140 standing at the center of the target may move in the direction of the sound source as a response. The AR response generator 550 may generate any action or inaction for the virtual object 140 to perform based on the external sound. For example, if the external sound, such as noise, is not recognized, the response generator 550 may not generate any action or may generate an inaction associated with the unrecognized sound for the virtual object 140 to perform. Further, any suitable methods may be used to identify positional information between the sound source 160 and the mobile device 110 and/or between the target 130 and the mobile device 110.

Figure 6:
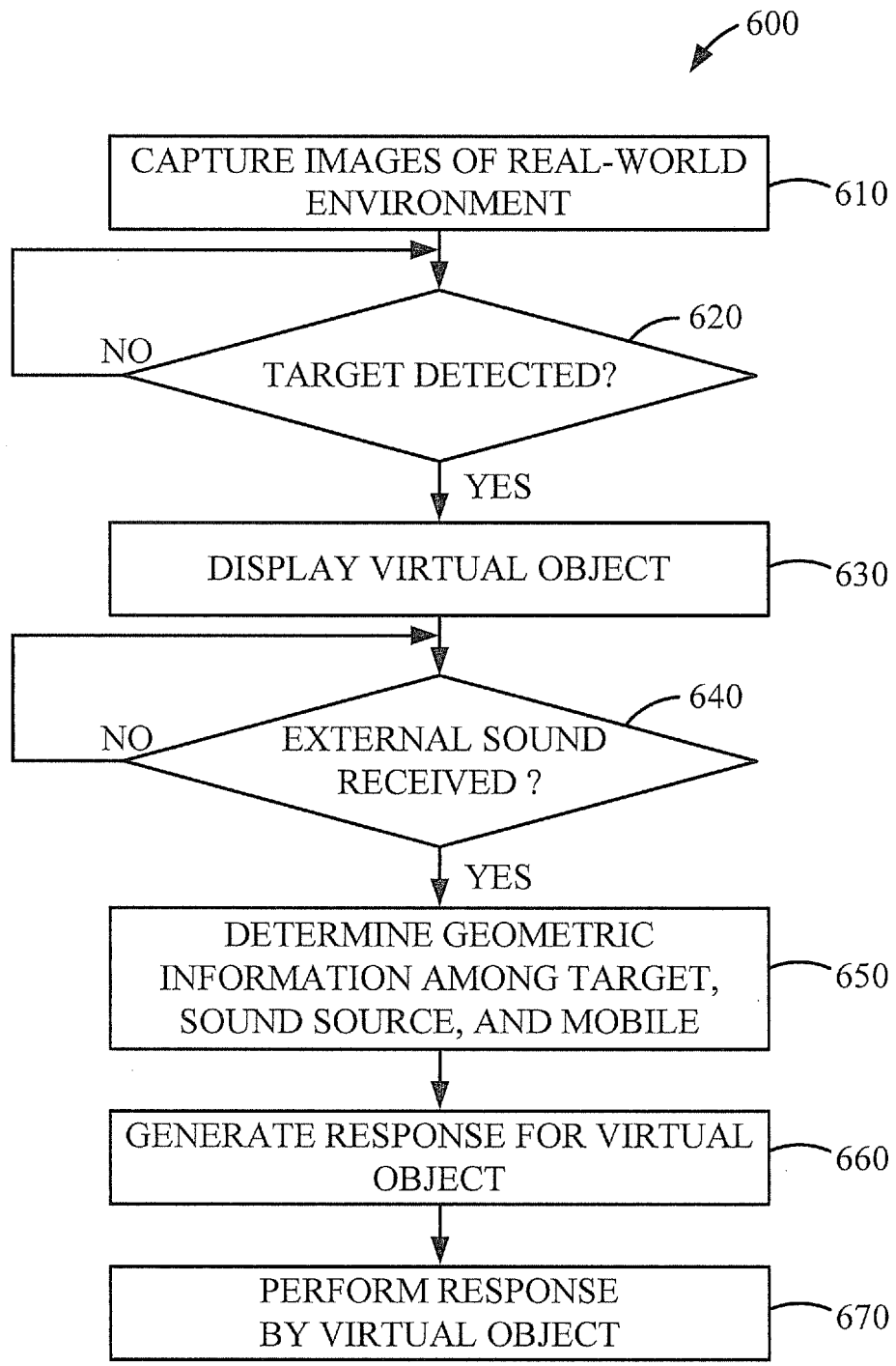
FIG. 6 is a flow chart illustrating a method for generating a response to be performed by a virtual object based on an external sound in accordance with one embodiment of the present disclosure.

FIG. 6 is a flow chart 600 illustrating a method for generating a response for a virtual object to perform based on an external sound according to one embodiment of the present disclosure. Initially at 610, a mobile device operates in a normal video mode. At 620, in the video mode, the captured images of the real-world environment in real time are continuously tracked to determine whether a target is detected. If a predetermined target is detected in a captured image, an AR application is initiated and a virtual object and a virtual environment are displayed at 630. Alternatively, the virtual object and the virtual environment may be displayed upon detecting a predetermined external sound. In some embodiments, if no target is detected in an image, the normal video operation continues. The AR environment is generated by combining the captured images in real time with the virtual object. For example, referring to FIG. 2A, when the mobile device 210 captures the real-world images including the target 230, then the virtual object 240 and the virtual background 270 appear on the target 230 in the AR environment on the display of the mobile device 210.

Then at 640, the mobile device determines whether an external sound is received. At 650, the mobile device determines geometric information (e.g., positional and directional relationships) among the target, the sound source, and the mobile device. For example, the geometric information between the target and the sound source may be determined based on the geometric information between the mobile device and target and the geometric information between the mobile device and the sound source, as described above. Based on the determined geometric information, a response for the virtual object is generated at 660. Then, at 670, the virtual object performing the response together with a virtual background (e.g., the virtual background 170) is displayed on the display of the mobile device.

Figure 7A:
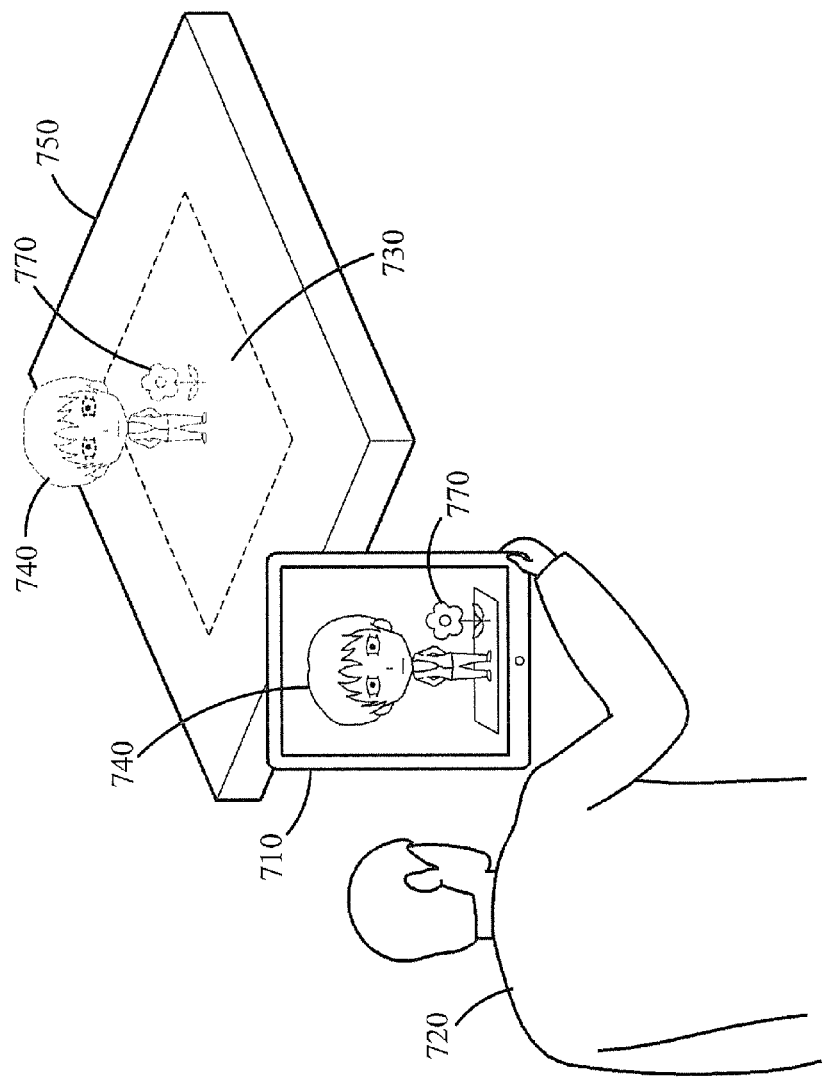
FIGS. 7A and 7B are diagrams that illustrate generating a response to be performed by a virtual object based on an external sound in accordance with one embodiment of the present disclosure.
Figure 7B:
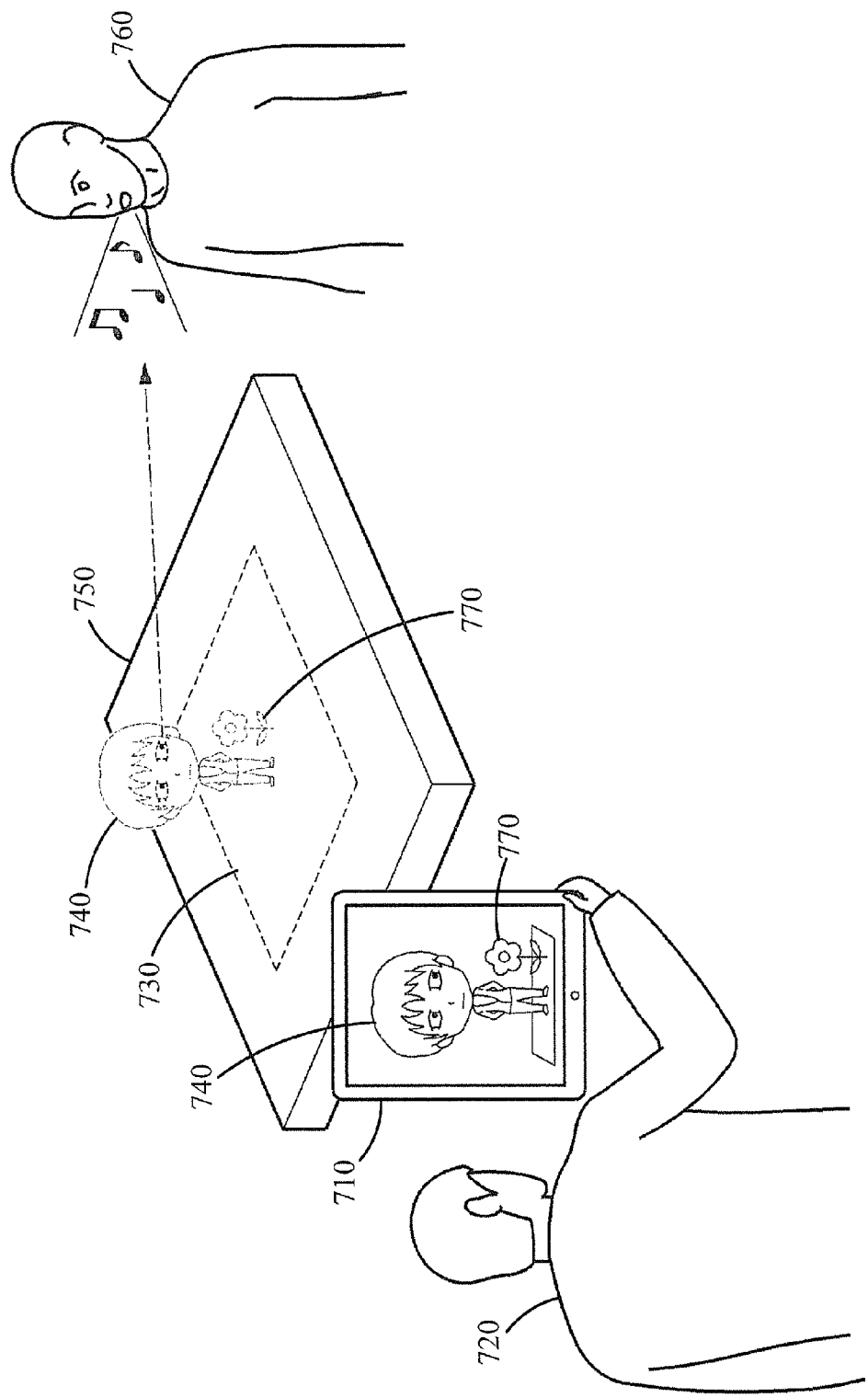

FIGS. 7A and 7B illustrate diagrams for generating a response to be performed for a virtual object based on an external sound according to one embodiment of the present disclosure. Initially, a mobile device 710 performs a normal camera operation. Once a predetermined target 730 is detected by the mobile device 710, an AR application may be initiated and the AR environment including a virtual object 740 and a virtual background 770 are displayed on the display of the mobile device 710, as shown in FIG. 7A.

While the AR application is running, the mobile device 710 is configured to detect the external sound from an external sound source 760. Based on the external sound, the mobile device 710 determines geometric information among the mobile device 710, the target 730, and the external sound source 760. The geometric information among the mobile device 710, the target 730 and the external sound source 760 may be used to determine a response for the virtual object 740 to perform in the AR environment. For example, in FIG. 7B, the virtual object 740 looks to the direction of the external sound source 760 as the response to the external sound.

Figure 8A:
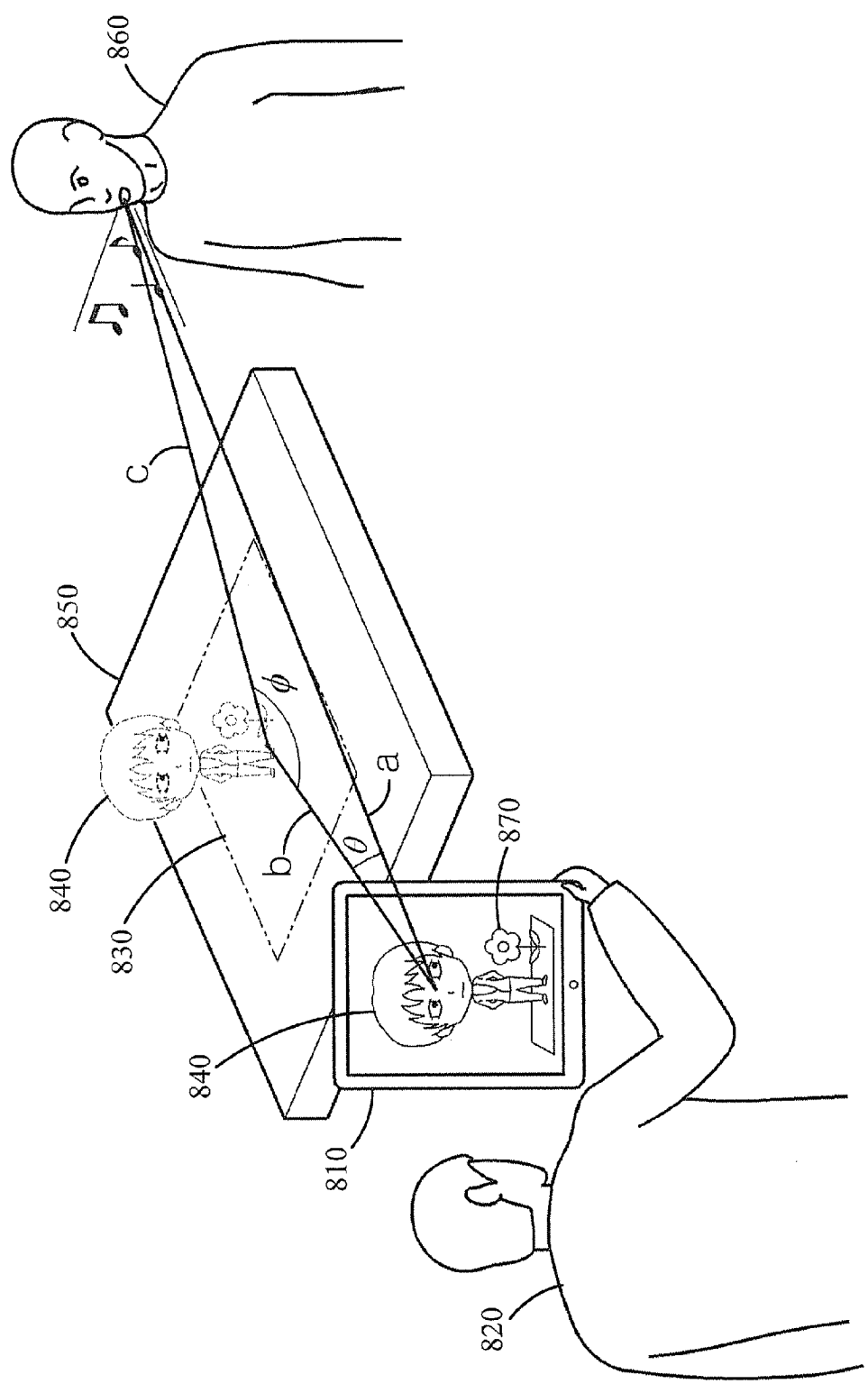
FIGS. 8A and 8B are diagrams that illustrate determining geometric relationships among a target, a sound source and a mobile device in accordance with one embodiment of the present disclosure.
Figure 8B:
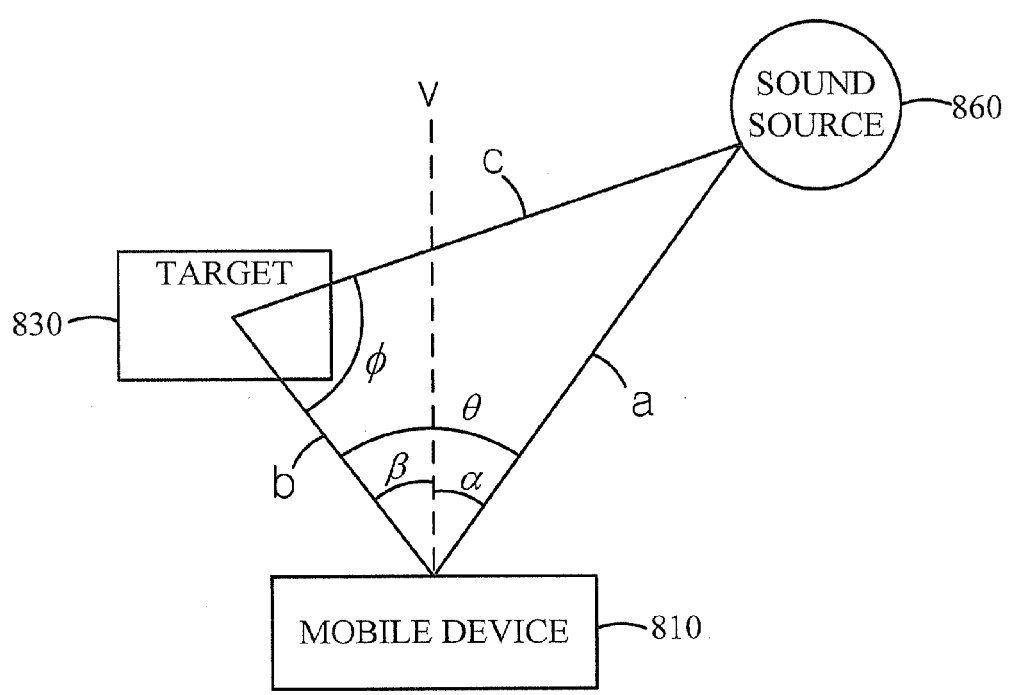

FIGS. 8A and 8B illustrate diagrams for determining geometric relationships among a target, a sound source and a mobile device for generating an AR response based on an external sound according to one embodiment of the present disclosure. Geometric information generally includes at least one of a distance and an angle between two objects. In one embodiment of the present disclosure, the geometric information may be determined using an image sensor and a sound sensor of a mobile device 810. In FIG. 8A, the geometric information between the mobile device 810 and a target 830 is determined by using the image sensor, while the geometric information between the mobile device 810 and an external sound source 860 is determined by using the sound sensor.

In FIG. 8A, a distance a indicates the distance between the mobile device 810 and the external sound source 860, a distance b indicates the distance between the mobile device 810 and the location of the target 830, and a distance c indicates the distance between the location of the target 830 and an external sound source 860. The details of measuring these distances will be described in more detail with reference to FIG. 8B. The distance a is measured from the center of the back side of the mobile device 810 to the estimated location of the external sound source 860, and the distance b is measured from the center of the back side of the mobile device 810 to the center of the target 830. Further, an angle θ is also determined in order to calculate the distance c between the virtual object 840 and the external sound source 860 and an angle φ of the target 830 formed with respect to the mobile device 810 and the external sound source 860. The method for calculating the distance c will be described in more detail with reference to FIG. 8B.

FIG. 8B illustrates simplified geometric relationships among the mobile device 810, the target 830, and the external sound source 860 from FIG. 8A. In FIG. 8B, the distances a, b and c are determined to generate a response for the virtual object 840 to perform based on the external sound received from the external sound source 860. To calculate the distance c between the target 830 and the external sound source 860, the distances a and b, and the angle θ are determined. The distance a between the mobile device 810 and the external sound source 860 may be determined by using any signal processing techniques well known in the art including, but not limited to, the beamforming technique. The beamforming technique estimates the location of the sound source based on the sound received from the sound source by the sound sensor of the mobile device 810.

Once the distance a is determined, the angle α may also be determined. First, the back side of the mobile device 810 is used as a reference plane, and a vector v orthogonal to the reference plane is determined. Then, the angle α is determined by calculating an angle between the vector v and distance a, as a vector from the reference plane to the external sound source 860.

Further, the distance b between the mobile device 810 and the target 830 may be determined by the camera pose estimation technique, well known in the art using the image sensor, as described above. Also, the angle β is determined by calculating an angle between the vector v and the distance b, as a vector from the reference plane to the target 830. In one embodiment according to the present disclosure, the angle β may be estimated by comparing coordinates of the stored feature points of the target and coordinates of the detected target 830 on the display screen of the mobile device 810.

Next, the angle θ is calculated by adding the angles α and β. Based on the distance a, distance b, and angle θ, the distance c between the target 830 and the external sound source 860 may be estimated. Further, based on the distance a, distance b, and distance c, the angle φ of the target 830 formed with respect to the mobile device 810 and the external sound source 860 can also be estimated. Using the distance c and angle φ, the mobile device 810 can determine a response for the virtual object 840 to perform.

Referring back to FIG. 8A, the response for the virtual object 840 is to look in the direction of the external sound source 860 from the target 830. Accordingly, in the AR environment displayed for the user 820, the virtual object 840 looks to the direction of the external sound source 860 based on the geometric information between the external sound source 860 and the virtual object 840, so as to enhance the real-world perception of the AR environment.

Figure 9A:
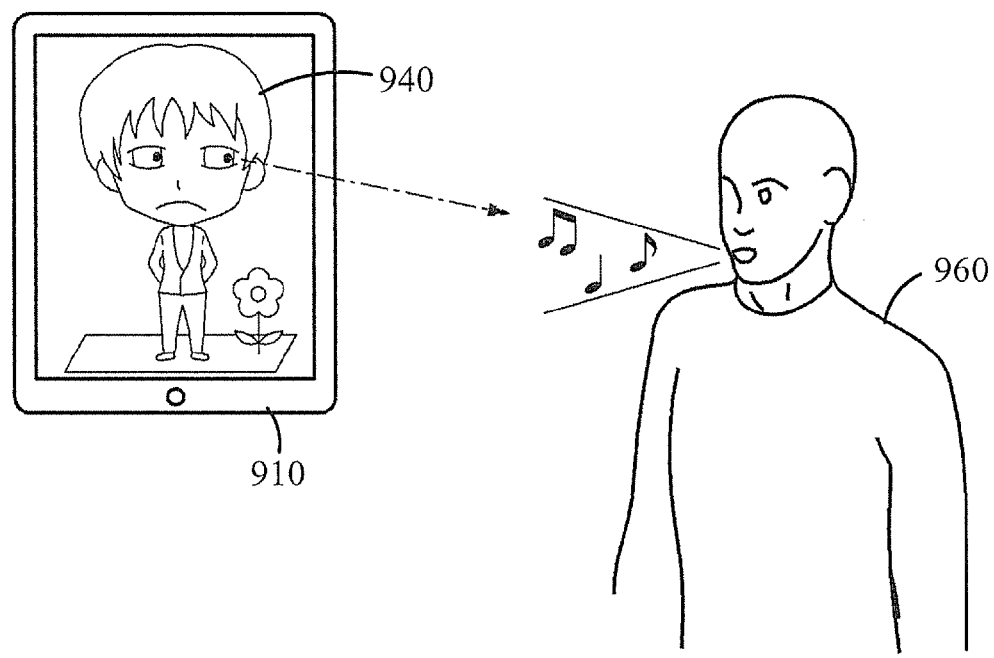
FIGS. 9A and 9B are diagrams that illustrate generating an AR response to be performed by a virtual object based on an external sound in accordance with another embodiment of the present disclosure.
Figure 9B:
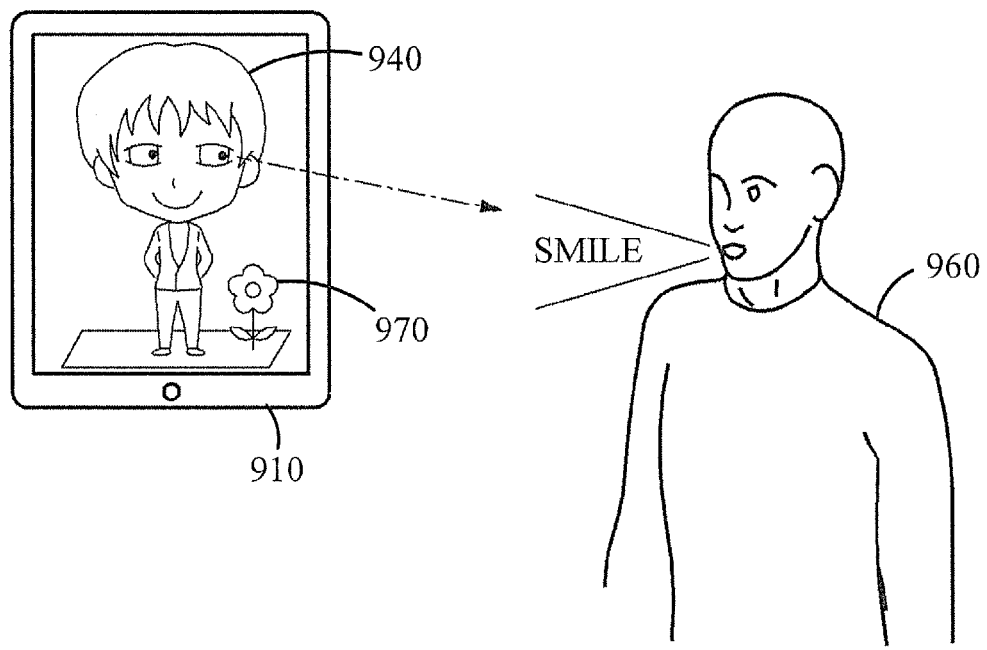

FIGS. 9A and 9B illustrate diagrams for generating a response to be performed by a virtual object 940 based on an external sound according to another embodiment of the present disclosure. For ease of understanding, a table and a target are not illustrated in 9A and 9B, but it should be appreciated that the AR environment is running in a mobile device 910 after the target has been detected by the mobile device 910. Similar to FIG. 7B, the AR application is initiated and the virtual object 940 looks to the direction of an external sound source 960, as a response based on the external sound, in FIG. 9A. The geometric information among a mobile device 910, a target, and the external sound source 960 may be determined to generate the response for the virtual object 940, as described above.

In response to the external sound, an additional response for the virtual object 940 may be generated, as shown in FIG. 9B. While the external sound is continually received from the external sound source 960, the virtual object 940 continues looking at the direction of the external sound source 960, as described with reference to FIG. 7B. From the external sound, if a predetermined word, such as "smile" is detected, a corresponding response for the virtual object 940 to perform based on the word "smile" may be searched in a storage unit of the mobile device 910. For example, as shown in FIG. 9B, the response for the word "smile" is a smiling facial expression for the virtual object 940. Accordingly, the virtual object 940 smiles based on the word "smile" in the AR environment. Alternatively, the received sound may be transmitted to an external device such as a server, which stores a predetermined list of sounds and corresponding responses. In this case, the external device may search a response corresponding to the received sound and provide the response for the virtual object 940 to perform in the mobile device.

Figure 10A:
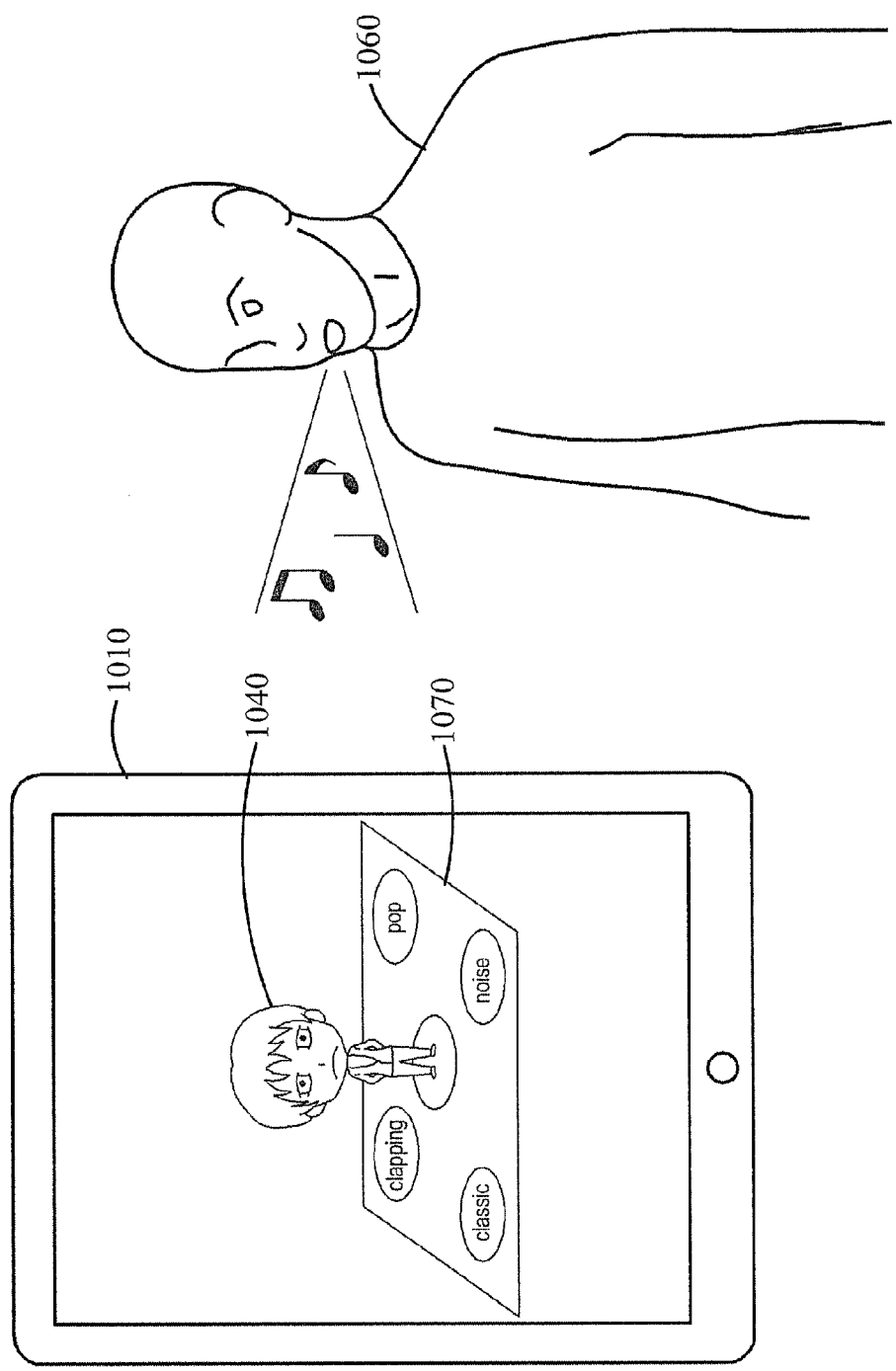
FIGS. 10A and 10B are diagrams that illustrate generating an AR response to be performed by a virtual object based on an external sound in accordance with another embodiment of the present disclosure.
Figure 10B:
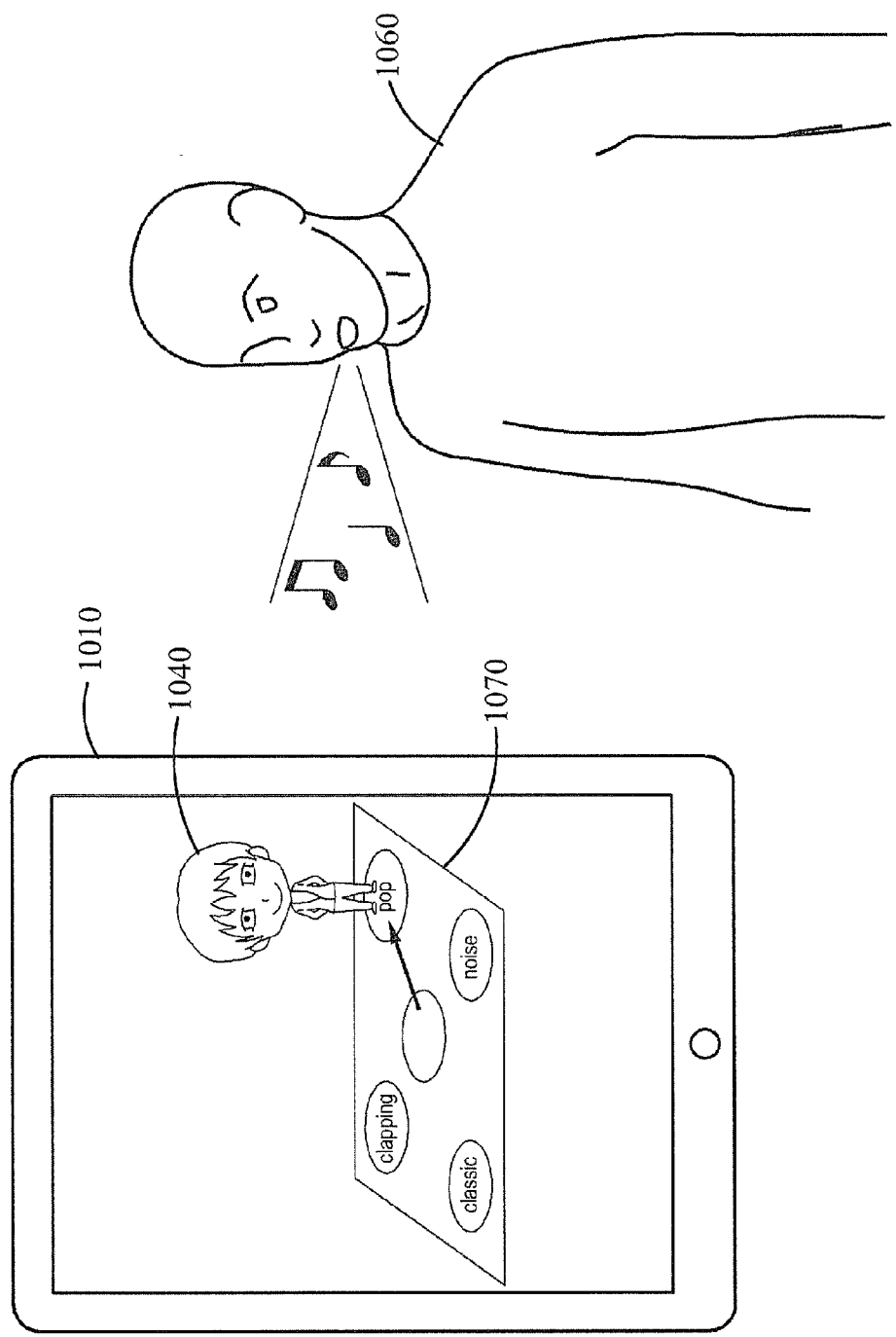

FIGS. 10A and 10B illustrate diagrams for generating a response to be performed by a virtual object 1040 based on an external sound according to another embodiment of the present disclosure. In FIG. 10A, the AR application including a virtual object 1040 and a virtual background 1070 is initiated in response to the detection of a target. In this illustrated embodiment, the virtual background 1070 includes a plurality of regions, such as circles, that identify different types of sound characteristics, for example, noise, pop, classic, and clapping sounds, and the virtual object 1040 is located at the center region. Alternatively, the regions of the virtual background 1070 may be of any shape or form including geometric shapes, maps, and virtual objects to facilitate identifying different types of sound characteristics.

Once the external sound from an external sound source 1060 is received, the mobile device 1010 determines whether the external sound may be identified to have a sound characteristic indicated in one of the plurality of regions in the AR environment. For example, when the external sound is received, at least one sound feature is extracted from the external sound. Then, the extracted sound feature of the external sound may be compared with a plurality of reference sound models, for example, statistical models (e.g., Gaussian mixture model (GMM)) associated with sound characteristics (or sound classes) identified in the plurality of regions of the virtual background 1070. The reference sound models may be pre-stored in the storage unit of the mobile device 1010 or may be stored external to the mobile device 1010 such as an external memory, a server, etc. In order to identify a sound characteristic of the extracted sound feature, the mobile device 1010 may be configured to perform a score operation to determine how the extracted sound features match each of the reference sound models.

In the score operation, a numerical value may be assigned to each of the reference sound models based on the matching results. In some embodiments, the mobile device 1010 then may determine a reference sound model (to identify a predetermined sound class) with the highest numerical value received in the score operation and output a corresponding response for the virtual object 1040 to perform. For example, as shown in FIG. 10B, a reference sound model indicative of pop music receives a highest numerical value as a result of the score operation, and the virtual object 1040 moves to the region labeled as "pop." In another embodiment, the score operation may provide numerical values only to some reference sound models. Alternatively, the score operation may merely provide the likelihood of the extracted sound feature being characterized in one of the reference sound models.

Figure 11:
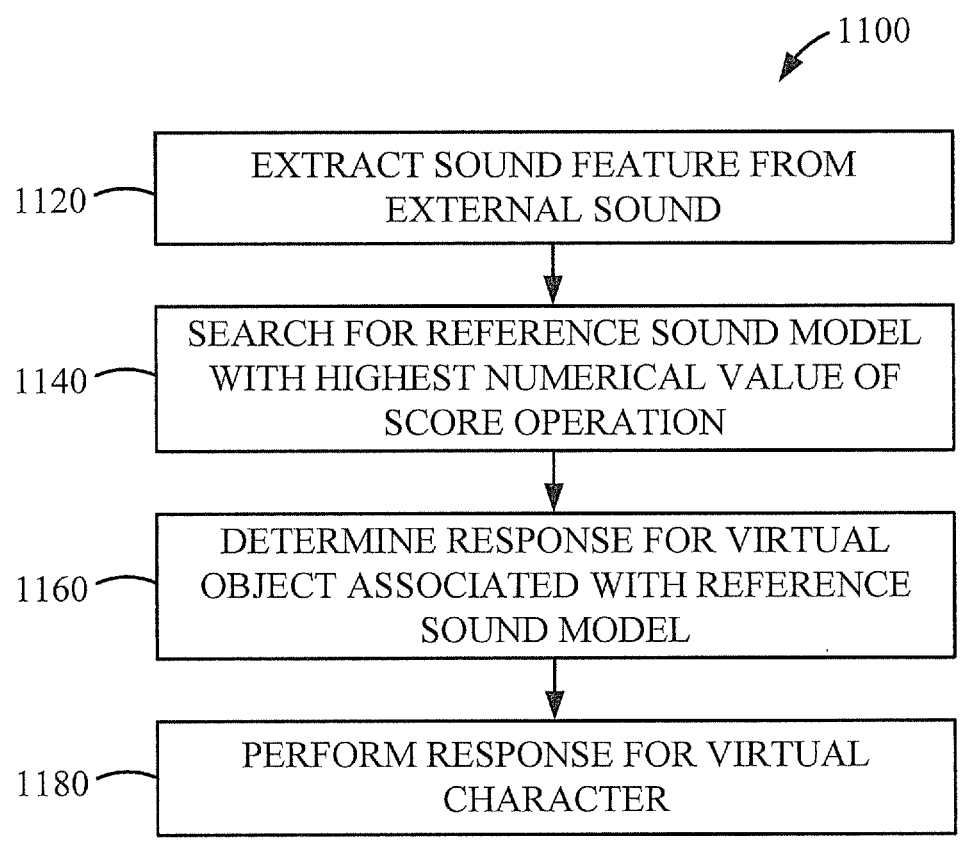
FIG. 11 is a flow chart illustrating a method for generating a response to be performed by a virtual object based on an external sound in an AR environment in accordance with one embodiment of the present disclosure.

FIG. 11 is a flow chart 1100 illustrating a method for generating a response to be performed by a virtual object based on an external sound according to one embodiment of the present disclosure. Initially, the AR application including a virtual object and a virtual background is initiated. When an external sound is received by the mobile device 1010, a sound feature is extracted from the external sound, at 1120. The extracted sound feature is then compared with reference sound models, and the reference sound models are given a numerical value based on the comparison results. At 1140, the mobile device 1010 searches for a reference sound model with the highest numerical value received based on the results of the score operation. Once the reference sound model with the highest numerical value is determined, a response associated with such reference sound model for the virtual object 1040 to perform is determined at 1160. The virtual object then performs the corresponding response in the AR environment at 1180.

Figure 12:
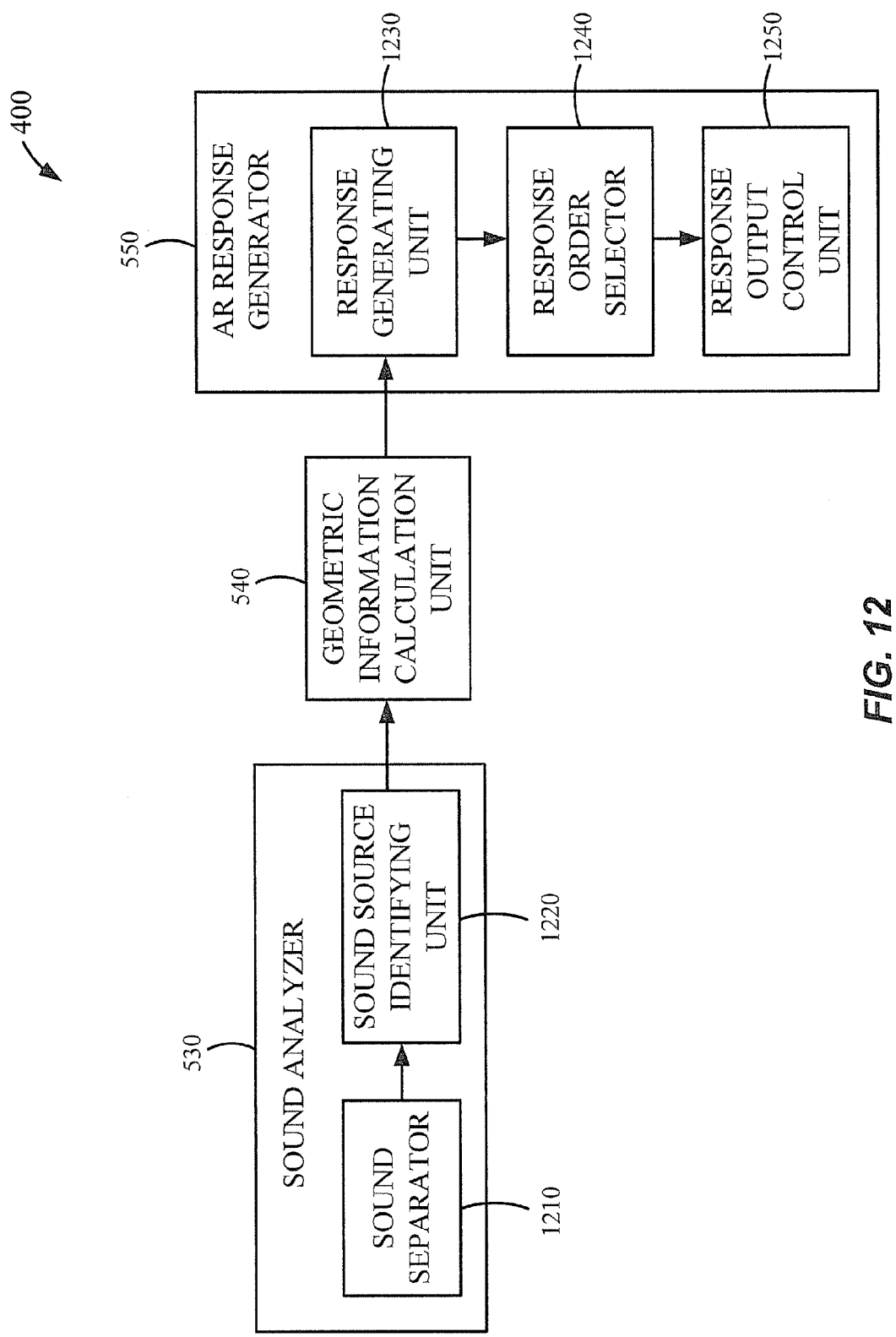
FIG. 12 is a block diagram illustrating a control unit of a mobile device for providing an augmented reality environment to a user in accordance with another embodiment of the present disclosure.

FIG. 12 illustrates a detailed block diagram for the control unit 400 for generating responses for a virtual object to perform according to one embodiment of the present disclosure. In the illustrated embodiment, a portion of the control unit 400 of FIG. 5 including the sound analyzer 530, the geometric information calculation unit 540, and the AR response generator 550, is described in more detail. Specifically, the sound analyzer 530 includes a sound separator 1210 and a sound source identifying unit 1220, and the AR response generator 550 includes a response generating unit 1230, a response order selector 1240, and a response output control unit 1250.

Next, an external sound including a plurality of sounds from different sound sources may be received by the sound sensor of the mobile device 110. The external sound is then provided to the sound separator 1210, which is configured to separate the external sound into a plurality of sounds originating from different sound sources. Once the separated sounds are provided to the sound source identifying unit 1220, the sound source identifying unit 1220 identifies a sound source associated with each of the separated sounds by determining the distance and the direction of each of the sound sources relative to the mobile device 110. The sound source identification information is then provided to the geometric information calculation unit 540 for determining the geometric information among the mobile device 110, the target and each sound source of the plurality of sounds, as described with reference to FIGS. 8A and 8B.

The AR response generator 550 is configured to receive the geometric information from the geometric information calculation unit 540 and to generate responses for the virtual object to perform in the AR environment. Specifically, the response generating unit 1230 of the AR response generator 550 is configured to generate a response for each of the sound sources based on the geometric information from the geometric information calculation unit 540, as described, for example, in FIG. 5. Based on the generated responses, the response order selector 1240 determines an output order of the responses for each of the sound sources. For example, the response order selector 1240 may determine an output order for the responses for the virtual object to perform according to a predetermined condition, such as proximity of the identified sound sources from the target. In one embodiment, the response order selector 1240 may determine the output order for the responses according to the relative distance between the sound source and the target. On the other hand, the condition for the output order may be to only output a response associated with a certain type of sound. Further, the output order may be selected or predetermined by the user before or after external sound is received or random. Once the output order for the responses is determined, the response output control unit 1250 is configured to output the responses for the virtual object to perform in the AR environment. Further, if one or more of the separated sounds do not correspond to any identifiable sound sources, the non-corresponding sounds may be identified as an ambient sound to be disregarded.

Figure 13:
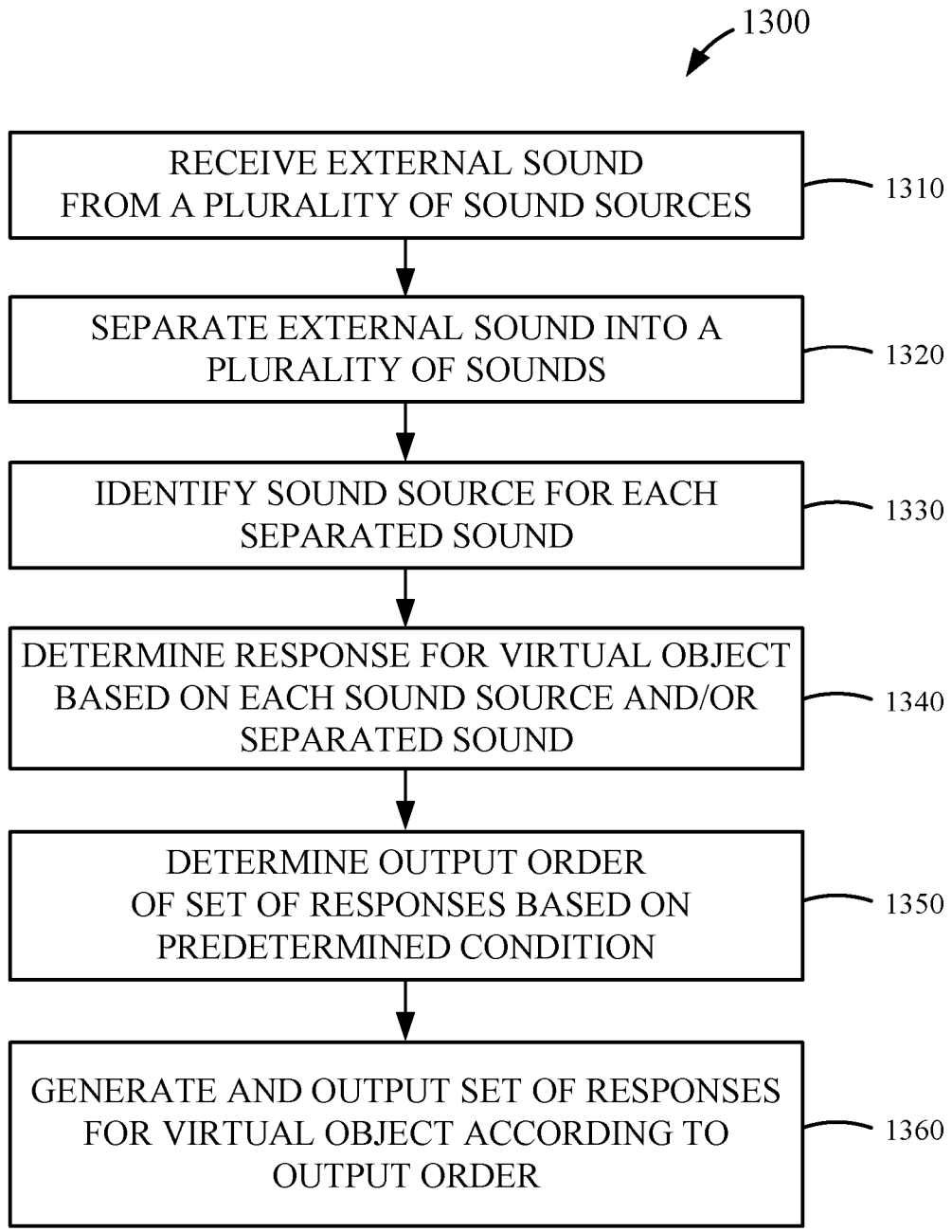
FIG. 13 is a flow chart illustrating a method for identifying different sound sources for an external sound, and generating a response for a virtual object associated with each of the plurality of sounds in accordance with one embodiment of the present disclosure.

FIG. 13 is a flow chart 1300 illustrating a method for generating a response for a virtual object associated with a plurality of sounds according to one embodiment of the present disclosure. At 1310, a sound sensor of a mobile device receives an external sound from the plurality of sound sources while the AR application is running. If the external sound includes a plurality of sounds from the plurality of sound sources, the external sound is separated into the plurality of sounds, at 1320. Each of the plurality of sounds is then identified with a different sound source, at 1330. Once sound sources are identified for the plurality of sounds, information regarding the location and the direction of the sound sources are determined using, for example, the beamforming technique, as described above. Using the sound source information for the sound sources, the geometric information among the mobile device, the target, and each of the sound sources are determined, as described above.

At 1340, using such geometric information, a response for the virtual object to perform is determined for each sound source and separated sound. Once the responses for sound source and/or sounds are determined, an output order of the responses for the virtual object to perform in the AR environment according to a predetermined condition is determined, at 1350. At 1360, the virtual object then performs the responses according to the output order.

Figure 14A:
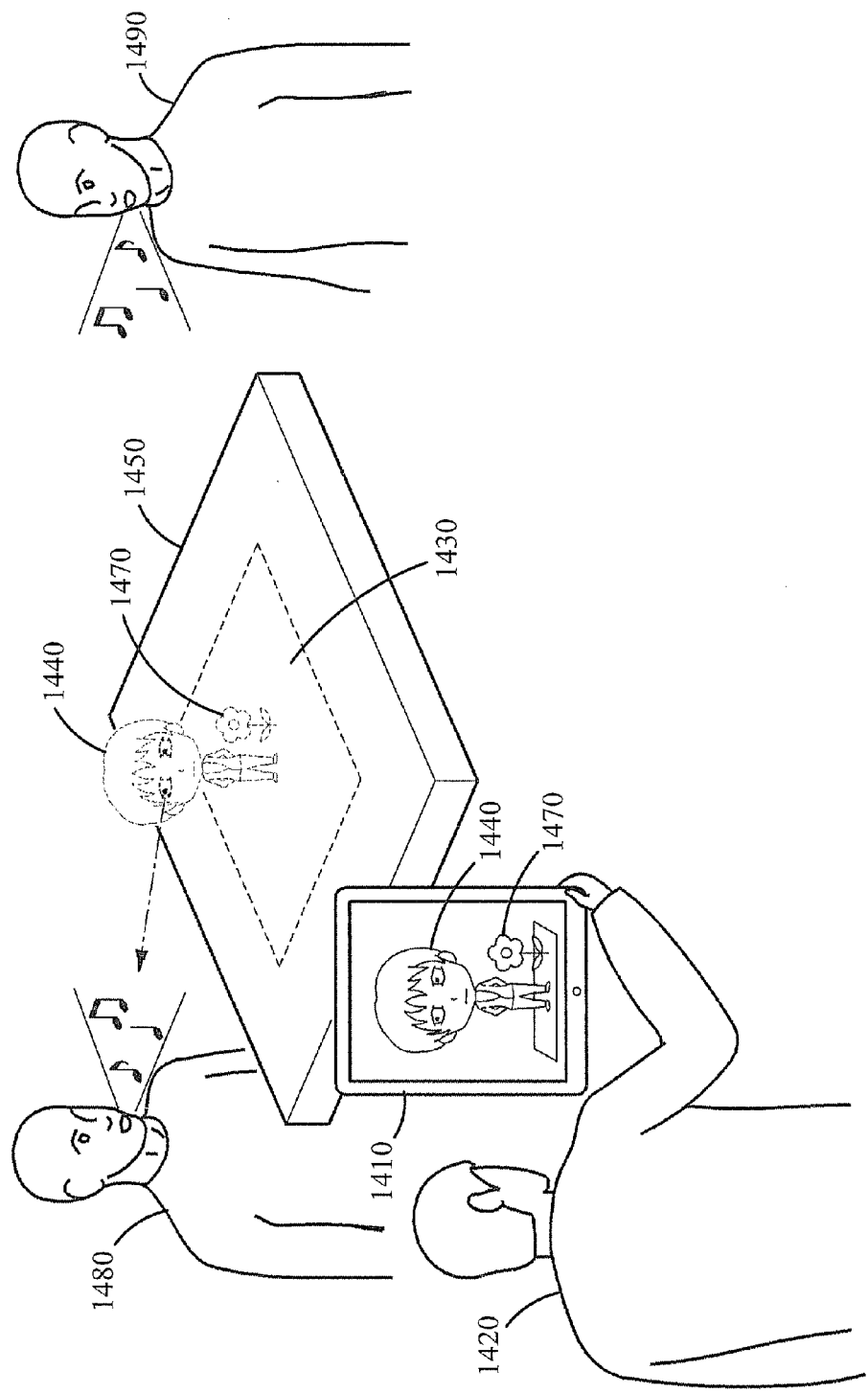
FIGS. 14A and 14B are diagrams that illustrate generating an order of AR responses to be performed by a virtual object based on an external sound from a plurality of sound sources in accordance with one embodiment of the present disclosure.
Figure 14B:
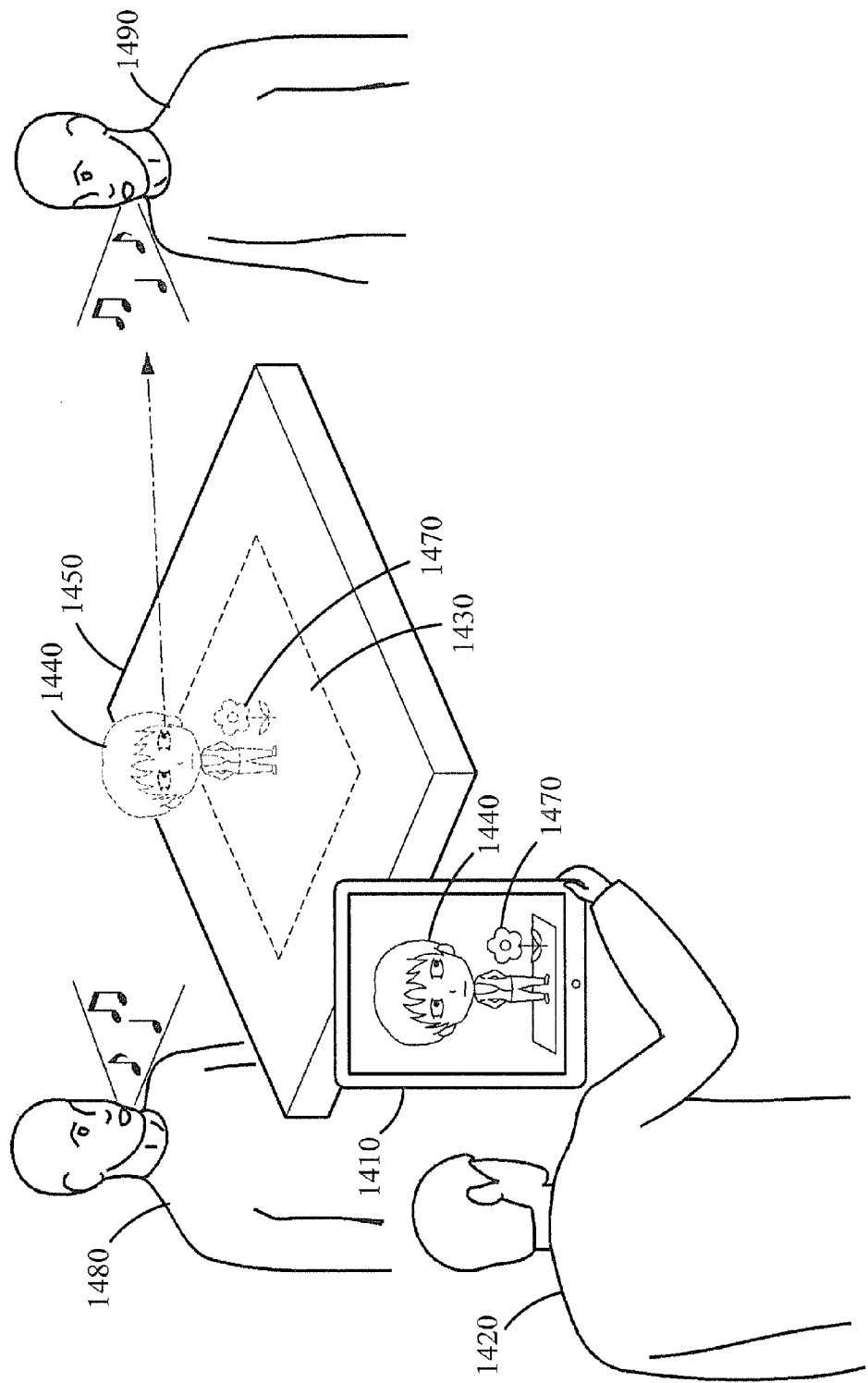

FIGS. 14A and 14B illustrate diagrams for generating an order of responses to be performed by a virtual object 1440 based on an external sound from a plurality of sound sources according to one embodiment of the present disclosure. Similar to FIG. 2A, a target 1430 is initially detected by the image sensor of a mobile device 1410, which initiates the AR application. Upon initiating the AR application, the virtual object 1440 and a virtual background 1470 are rendered in the AR environment on the display of the mobile device 1410. While the AR application is running, the sound sensor of the mobile device 1410 receives an external sound from multiple sound sources 1480 and 1490 as illustrated in FIG. 14A. As the external sound is received, the mobile device 1410 separates the sound into a plurality of sounds from different sound sources. For each external sound received, a corresponding sound source for each of the separated sounds is identified. Based on the identification of the sound sources, a response for each of the separated sounds and/or sound sources is generated. Once the responses have been generated, an output order of the responses for the virtual object 1440 to perform is selected, and based on the output order of the responses, the virtual object 1440 then performs the responses in the AR environment.

In some embodiments, a predetermined output sequence to be output as responses may be generated for the virtual object to perform based on the distance of the sound sources 1480 and 1490 from the virtual object 1440. For example, as shown in FIG. 14A, the sound source 1480 is located closer to the target 1430 than the sound source 1490. In this illustrated embodiment, the output order for the virtual object 1440 includes looking at the sound source 1480 that is closer to the target 1440 first, and then looking at the sound source 1490 that is further away from the target 1430. Therefore, the virtual object 1440 first stares at the sound source 1480, which is located closer to the target 1430, based on the sound from the sound source 1480 in FIG. 14A. Then, the virtual object 1440 looks at the sound source 1490, which is located further away from the target 1430, in response to the sound from the sound source 1490 as shown in FIG. 14B.

Figure 15:
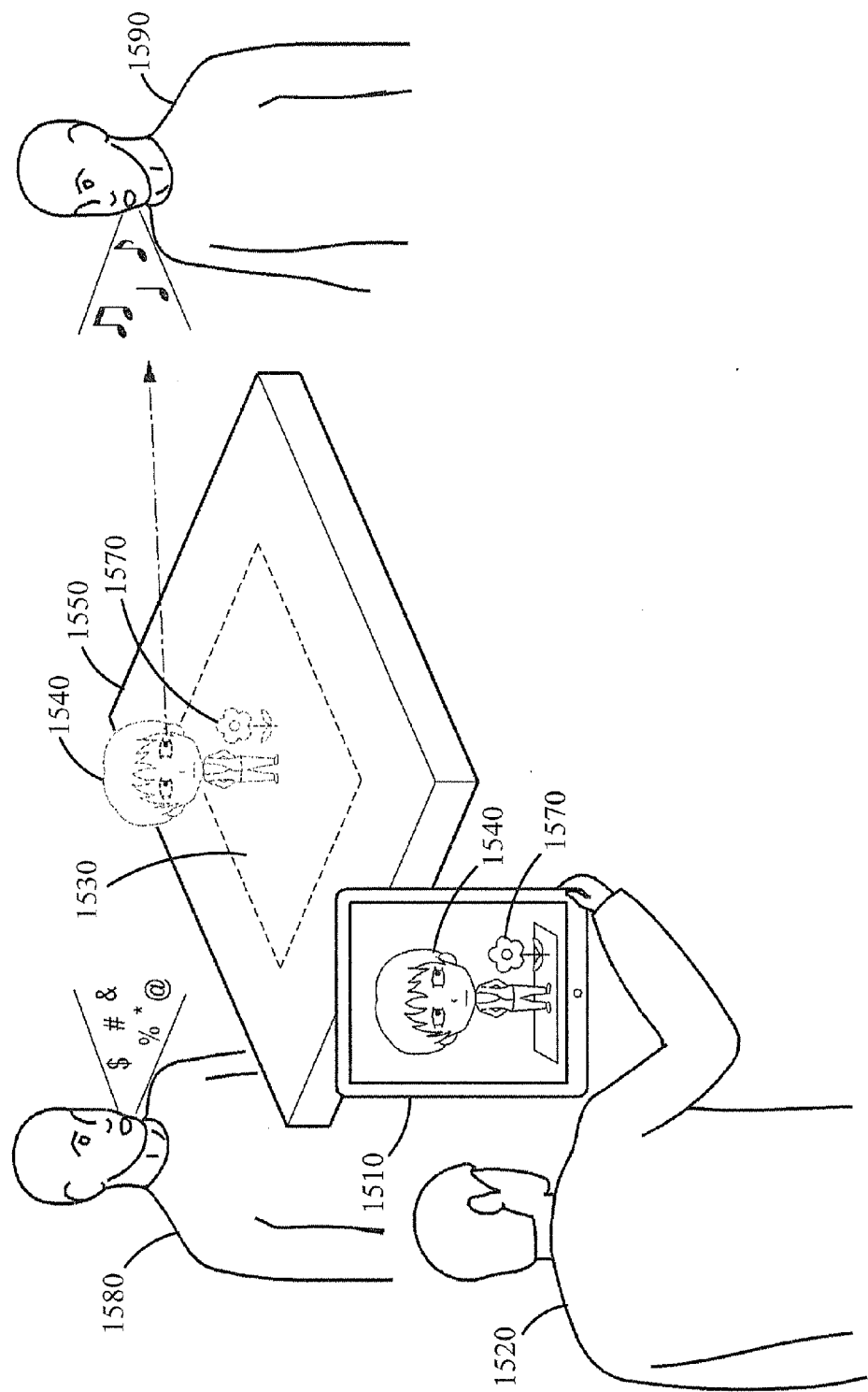
FIG. 15 is a diagram that illustrates generating an order of AR responses to be performed by a virtual object based on an external sound from a plurality of sound sources in accordance with another embodiment of the present disclosure.

FIG. 15 illustrates a diagram for generating an order of responses to be performed by a virtual object 1540 based on an external sound from a plurality of sound sources according to another embodiment of the present disclosure. In FIG. 15, the external sound received by a mobile device 1510 includes a sound from a sound source 1580 and a sound from the sound source 1590. For each external sound received, a corresponding sound source for each of the separated sounds is identified. Further, the separated sounds are analyzed to determine whether the sounds include sound characteristics stored in the storage of the mobile device 1510. In this case, sound characteristic identification operations similar to those described with reference to FIGS. 9A and 9B may be performed. Based on the identification of the sound sources and sound characteristics of the plurality of sounds, a response for each of the separated sounds and/or sound sources may be generated. That is, the sound from the sound source 1580 is determined to be noise and not to be associated with any responses for the virtual object 1540 to perform, whereas a response for the sound from the sound source 1590 is to look at the sound source 1590. Accordingly, as illustrated in FIG. 15, the virtual object 1540 only looks at the sound source 1590 based on the sound from the sound source, and does not look at the sound source 1580 in response to the external sound.

Figure 16A:
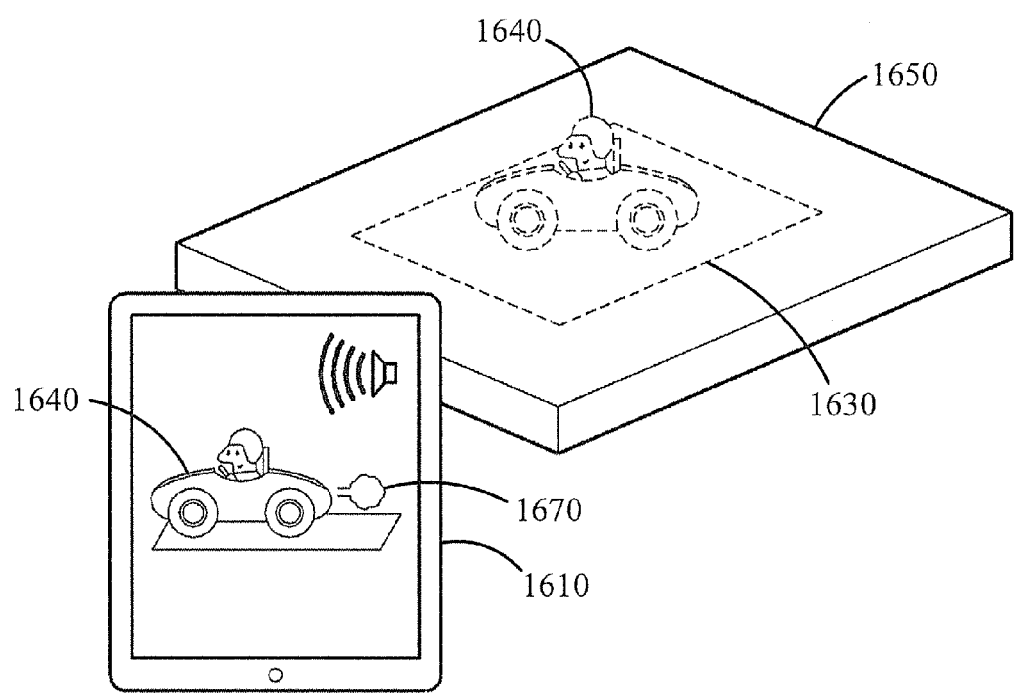
FIGS. 16A and 16B are diagrams that illustrate adjusting a sound volume of a virtual object based on a distance between a mobile device and a target in accordance with one embodiment of the present disclosure.
Figure 16B:
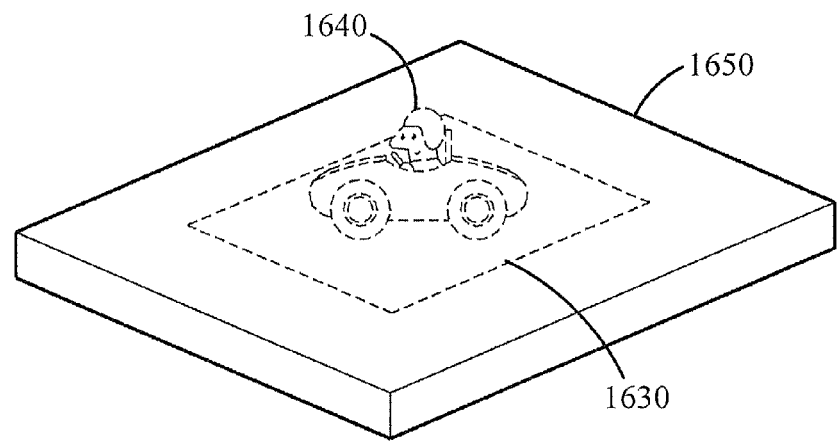
Figure 16B:
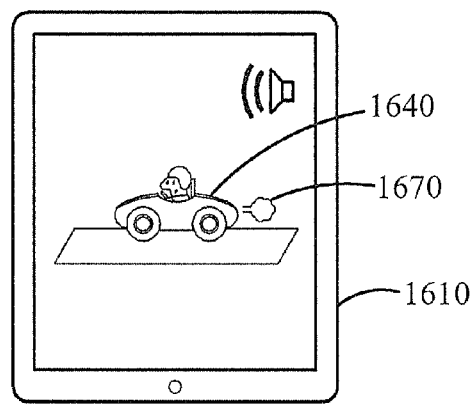

FIGS. 16A and 16B illustrate diagrams for adjusting a sound volume of a virtual object 1640 based on a distance between a mobile device 1610 and a target 1630 according to one embodiment of the present disclosure. The volume of the sound generated by the virtual object 1640 may be changed based on the distance between the mobile device 1610 and the target 1630. The distance between the mobile device 1610 and the target 1630 may be estimated by using the camera pose estimation technique, as mentioned above. For example, the relative distance between the mobile device 1610 and the target 1630 is calculated by comparing the sizes of a previously captured target and a currently captured target. If the size of the previously captured target is smaller than the size of the currently captured target, it is determined that the distance between the mobile device 1610 and the target 1630 has decreased. Conversely, if the size of the previously captured target is larger than the size of the currently captured target, it is determined that the distance between the mobile device 1610 and the target 1630 has increased. Based on the relative distance between the mobile device 1610 and the target 1630, the volume of the sound in the AR environment can be adjusted to reflect the distance.

In FIG. 16A, initially, the AR application including the virtual object 1640 and a virtual background 1670 is initiated in response to the detection of the target 1630. In this illustrated embodiment, the mobile device 1610 is configured to output sound, for example, an engine sound, in accordance with actions performed by the virtual object 1640 in the AR environment. As shown in FIG. 16B, when the mobile device 1610 moves further away from the target 1630, the virtual object 1640 would appear to be smaller in the AR environment. To enhance reality, the sound volume generated by the virtual object 1640 also decreases as the mobile device 1610 moves further away from the target 1630. Conversely, the sound volume generated by the virtual object 1640 increases as the mobile device 1610 moves closer to the target 1630. Thus, the sound volume may be adjusted based on the location of the mobile device 1610 with respect to the target 1630.

Figure 17:
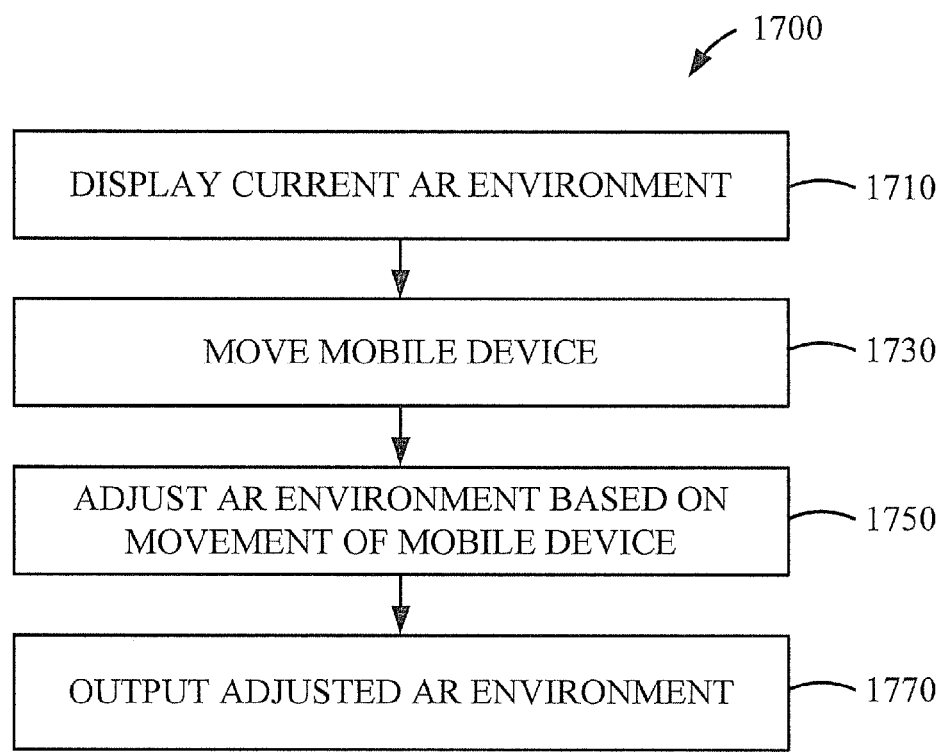
FIG. 17 is a flow chart illustrating a method for adjusting a sound volume of a virtual object based on a distance between a mobile device and a target in accordance with one embodiment of the present disclosure.

FIG. 17 is a flow chart 1700 illustrating a method for adjusting a sound volume of a virtual object based on a distance between a mobile device and a target in accordance with one embodiment of the present disclosure. FIG. 17 will be described with reference to FIGS. 16A and 16B. When the target 1630 is detected, an AR application is initiated and the virtual object 1640 and the virtual background 1670 are displayed in the AR environment on the display of the mobile device 1610, at 1710. At this time, the virtual object 1640 also outputs an engine sound at a certain sound volume. When the mobile device 1610 moves further away from the target 1630 at 1730, the mobile device 1610 adjusts to decrease the sound volume generated by the virtual object 1640 based on the movement of the mobile device 1610, at 1750. Further, the mobile device 1610 adjusts the AR environment to make the virtual object 1640 to appear smaller therein, at 1750. Then, the adjusted AR environment and the sound volume are output to the display of the mobile device 1610, at 1770.

Figure 18:
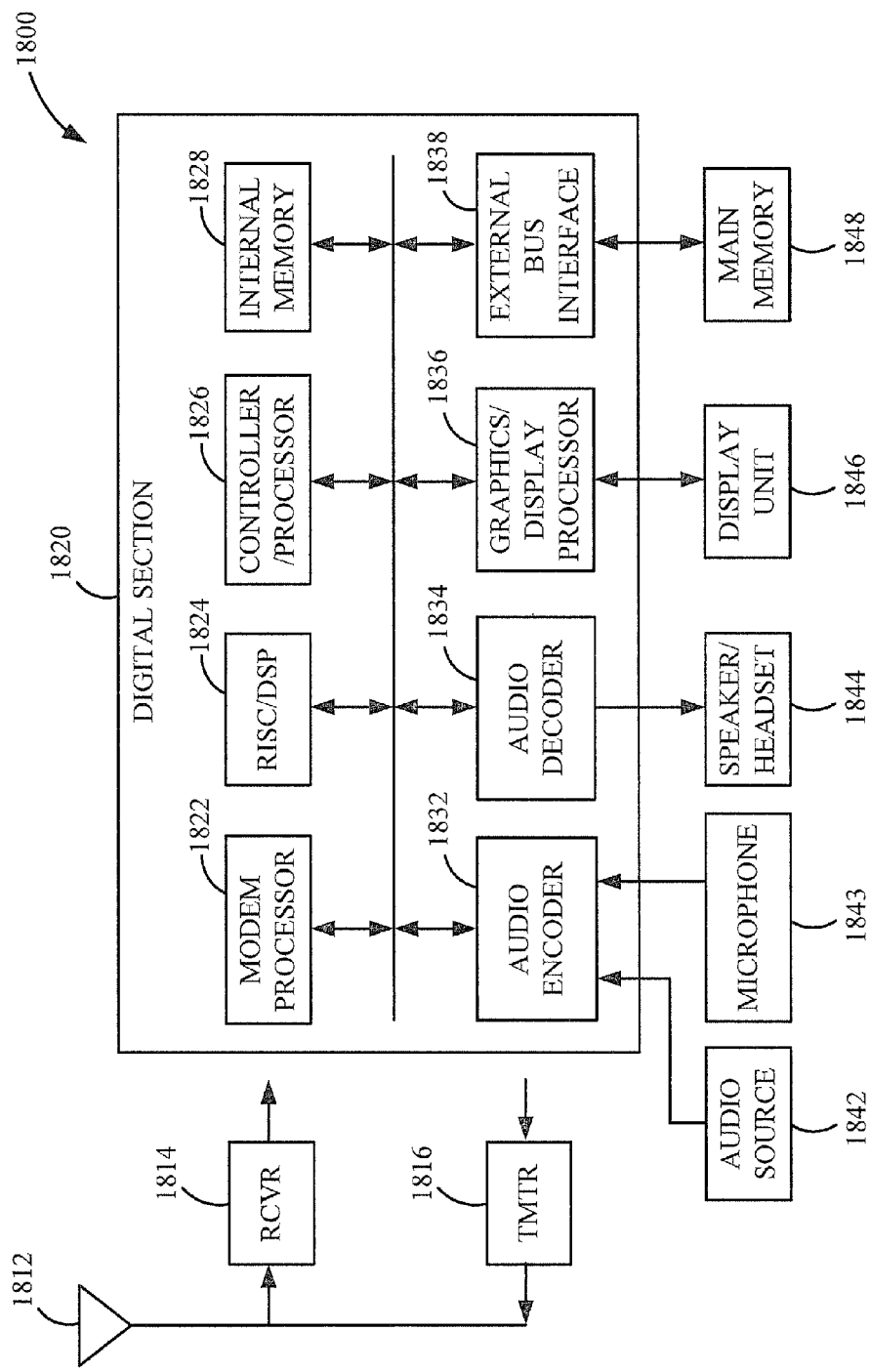
FIG. 18 is a block diagram of an exemplary mobile computing device in which the AR application of the present disclosure may be executed according to some embodiments of the present disclosure.

FIG. 18 illustrates a configuration of an exemplary mobile device 1800 in which the AR application of the present disclosure may be executed. The configuration of the mobile device 1800 may be implemented in the mobile devices according to the above embodiments described with reference to FIGS. 1 to 18. The mobile device 1800 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, Wideband CDMA (WCDMA) system, Long Tern Evolution (LTE) system, LTE Advanced system, etc. Further, the mobile device 1800 may communicate directly with another mobile device, e.g., using Wi-Fi Direct, Bluetooth, or FlashLinq technology.

The mobile device 1800 is capable of providing bidirectional communication via a receive path and a transmit path. On the receive path, signals transmitted by base stations are received by an antenna 1812 and are provided to a receiver (RCVR) 1814. The receiver 1814 conditions and digitizes the received signal and provides samples such as the conditioned and digitized digital signal to a digital section for further processing. On the transmit path, a transmitter (TMTR) 1816 receives data to be transmitted from a digital section 1820, processes and conditions the data, and generates a modulated signal, which is transmitted via the antenna 1812 to the base stations. The receiver 1814 and the transmitter 1816 may be part of a transceiver that may support CDMA, GSM, LTE, LTE Advanced, etc.

The digital section 1820 includes various processing, interface, and memory units such as, for example, a modem processor 1822, a reduced instruction set computer/digital signal processor (RISC/DSP) 1824, a controller/processor 1826, an internal memory 1828, a generalized audio encoder 1832, a generalized audio decoder 1834, a graphics/display processor 1836, and an external bus interface (EBI) 1838. The modem processor 1822 may perform processing for data transmission and reception, e.g., encoding, modulation, demodulation, and decoding. The RISC/DSP 1824 may perform general and specialized processing for the mobile device 1800. The controller/processor 1826 may perform the operation of various processing and interface units within the digital section 1820. The internal memory 1828 may store data and/or instructions for various units within the digital section 1820.

The generalized audio encoder 1832 may perform encoding for input signals from an audio source 1842, a microphone 1843, etc. The generalized audio decoder 1834 may perform decoding for coded audio data and may provide output signals to a speaker/headset 1844. The graphics/display processor 1836 may perform processing for graphics, videos, images, and texts, which may be presented to a display unit 1846. The EBI 1838 may facilitate transfer of data between the digital section 1820 and a main memory 1848.

The digital section 1820 may be implemented with one or more processors, DSPs, microprocessors, RISCs, etc. The digital section 1820 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium.

For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for responding in an augmented reality (AR) application of a mobile device to an external sound, the method comprising:
   detecting a target via an image sensor of the mobile device;
   initiating a virtual object in the AR application and positioning the virtual object at a position corresponding to a location of the target based on detecting that the target satisfies an AR application initialization criterion;
   receiving, by at least one sound sensor of the mobile device, the external sound from a sound source;
   determining, at the mobile device, first geometric information that includes a first direction between the sound source and the target, the first direction different than a second direction between the target and the mobile device; and
   causing the virtual object to perform, in the AR application, at least one response to the external sound based on the first geometric information.

2. The method of claim 1, further comprising:
   determining the second direction;
   determining a third direction between the mobile device and the sound source; and
   calculating the first direction based on the second direction and the third direction.

3. The method of claim 2, wherein the first direction is calculated based further on:
   a distance between the mobile device and the target; and
   a distance between the mobile device and the sound source.

4. The method of claim 2, wherein the third direction is determined based on a camera pose estimation.

5. The method of claim 1, wherein causing the virtual object to perform the at least one response includes:
   extracting at least one sound feature from the received external sound;
   identifying the extracted sound feature as corresponding to at least one sound class; and identifying the at least one response based on the at least one sound class.

6. The method of claim 1, further comprising, after receiving the external sound:
   determining whether the external sound is received from two or more sound sources;
   if the external sound is received from the two or more sound sources, separating the received external sound into a plurality of sounds;
   identifying additional sound sources associated with the plurality of separated sounds; and
   determining fourth geometric information between the identified sound sources and the target.

7. The method of claim 6, further comprising determining an order of the at least one response for the virtual object, wherein the virtual object is caused to perform the at least one response based on the determined order.

8. The method of claim 1, further comprising:
displaying the virtual object but not the target at the mobile device based on detecting the target.

9. The method of claim 1, wherein determining the first geometric information includes determining one or more of: a distance between the sound source and the target, a location of the mobile device, a location of the target, or a location of the sound source.

10. The method of claim 1, further comprising, after receiving the external sound:
determining whether the external sound is received from two or more sound sources;
if the external sound is received from the two or more sound sources, separating the received external sound into a plurality of sounds;
determining second geometric information between each of two or more sound sources and the target;
identifying each of the separated sounds as corresponding to at least one sound class; and
identifying the at least one response based on the at least one sound class.

11. A device for responding to an external sound in an augmented reality (AR) application, the device comprising:
an image sensor configured to receive at least one image including a target;
at least one sound sensor configured to receive the external sound from a sound source; and
a control unit including:
a target object detector configured to detect the target in the at least one image;
an application initiating unit configured to initiate a virtual object in the AR application and to position the virtual object at a position corresponding to a location of the target based on detecting the target;
a geometric information calculation unit configured to determine first geometric information that includes a first direction between the sound source and the target, the first direction different than a second direction between the target and the device; and
an AR response generator configured to cause the virtual object to perform, in the AR application, an action that comprises at least one response to the external sound based on the first geometric information.

12. The device of claim 11, wherein the geometric information calculation unit is further configured to:
determine the second direction;
determine a third direction between the device and the sound source; and
calculate the first direction based on the second direction and the third direction.

13. The device of claim 12, wherein the first direction is calculated based further on:
a distance between the device and the target; and
a distance between the device and the sound source.

14. The device of claim 12, wherein the third direction is determined based on a camera pose estimation.

15. The device of claim 11, wherein the AR response generator is further configured to:
extract at least one sound feature from the received external sound;
identify the extracted sound feature as corresponding to at least one sound class; and
identify the at least one response based on the at least one sound class.

16. The device of claim 11, further comprising:
a sound analyzer configured to determine whether the external sound is received from two or more sound sources, separate the received external sound into a plurality of sounds if the external sound is received from the two or more sound sources, identify additional sound sources associated with the plurality of separated sounds, and determine second geometric information between the identified sound sources and the target.

17. The device of claim 16, wherein the AR response generator is further configured to determine an order of actions, wherein the virtual object is caused to perform the at least one action based on the determined order.

18. The device of claim 11, wherein: the AR application is configured to cause a display of the virtual object but not the target based on the target object detector detecting the target.

19. The device of claim 11, wherein the geometric information calculation unit is further configured to determine one or more of: a distance between the sound source and the target, a location of the device, a location of the target, or a location of the sound source.

20. The device of claim 11, further comprising:
a sound analyzer configured to determine whether the external sound is received from two or more sound sources, separate the received external sound into a plurality of sounds if the external sound is received from the two or more sound sources, determine second geometric information between each of the two or more sound sources and the target, identify each of the separated sounds as corresponding to at least one sound class, and identify the at least one response for the virtual object based on the at least one sound class and the second geometric information.

21. A non-transitory computer-readable storage medium storing instructions that are executable by a processor to perform operations comprising:
detecting a target;
initiating a virtual object in an augmented reality (AR) application and positioning the virtual object at a position corresponding to a location of the target based on detecting the target;
receiving, by at least one sound sensor of a mobile device, an external sound from a sound source;
determining first geometric information that includes a first direction between the sound source and the target, the first direction different than a second direction between the target and the mobile device; and
causing the virtual object to perform, in the AR application, at least one action comprising a response to the external sound based on the first geometric information.

22. The non-transitory computer-readable storage medium of claim 21, wherein the operations further include:
determining the second direction;
determining a third direction between the mobile device and the sound source; and
calculating the first direction based on the second direction and the third direction.

23. The non-transitory computer-readable storage medium of claim 22, wherein the operations further comprise, after receiving the external sound:
determining whether the external sound is received from two or more sound sources;

if the external sound is received from the two or more sound sources, separating the received external sound into a plurality of sounds;

identifying additional sound sources associated with the plurality of separated sounds; and determining fourth geometric information between the identified additional sound sources and the target.

24. The non-transitory computer-readable storage medium of claim 23, wherein the operations further comprise determining an order of actions; wherein the virtual object is caused to perform the at least one action based on the determined order.

25. A device for responding to an external sound in an augmented reality (AR) application, the device comprising:

means for detecting a target;

means for initiating a virtual object in the AR application and positioning the virtual object at a position corresponding to a location of the target based on detecting the target;

means for receiving the external sound from a sound source;

means for determining first geometric information that includes a first direction between the sound source and the target, the first direction different than a second direction between the target and the device; and means for causing the virtual object to perform, in the AR application, at least one response to the external sound based on the first geometric information.

26. The device of claim 25, wherein the means for determining the first geometric information is configured to:

determine the second direction;

determine a third direction between the device and the sound source; and calculate the first direction based on the second direction and the third direction.

27. The device of claim 25, wherein the means for determining the first geometric information is configured to:

determine a distance between the device and the target; and determine a distance between the device and the sound source.

28. The device of claim 25, wherein the means for determining the first geometric information is configured to determine the second direction based on a camera pose estimation.

29. The device of claim 25, wherein the means for causing the virtual object to perform, in the AR application, the at least one response is configured to:

extract at least one sound feature from the received external sound;

identify the extracted sound feature as corresponding to at least one sound class; and identify the at least one response based on the at least one sound class.

30. The device of claim 25, wherein the means for determining the first geometric information is configured to:

determine whether the external sound is received from two or more sound sources;

if the external sound is received from the two or more sound sources, separate the received external sound into a plurality of sounds;

identify sound sources associated with the plurality of separated sounds; and determine second geometric information between the identified sound sources and the target.

31. The device of claim 30, wherein the means for causing the virtual object to perform, in the AR application, the at least one response is configured to determine an order of the at least one response for the virtual object, wherein the virtual object is caused to perform the at least one response based on the determined order.

32. The device of claim 25, wherein:

the means for determining the first geometric information is configured to determine whether the external sound is received from two or more sound sources and, if the external sound is received from the two or more sound sources, separate the received external sound into a plurality of sounds, and determine second geometric information between each of two or more sound sources and the target; and the means for causing the virtual object to perform is configured to identify each of the separated sounds as corresponding to at least one sound class, and to identify the at least one response based on the at least one sound class and the second geometric information.

33. The method of claim 1, further comprising determining the first direction based on the external sound using a beam forming technique.

34. The method of claim 1, wherein causing the virtual object to perform the at least one response includes causing the virtual object to turn toward the sound source, smile, or ignore the external sound.

35. The method of claim 7, wherein the order is determined based on a distance between the target and the sound source.

36. The device of claim 16, wherein an order of the at least one response is determined based on distances between the target and the two or more sound sources, determined based on user input, or randomly selected.

37. The method of claim 1, wherein initiating the virtual object is further based on detecting that the target satisfies an AR application initialization criterion.

* * * * *